(12) United States Patent
Palanki et al.

(10) Patent No.: US 8,885,628 B2
(45) Date of Patent: Nov. 11, 2014

(54) CODE DIVISION MULTIPLEXING IN A SINGLE-CARRIER FREQUENCY DIVISION MULTIPLE ACCESS SYSTEM

(75) Inventors: Ravi Palanki, San Diego, CA (US); Aamod Khandekar, San Diego, CA (US); Arak Sutivong, Bangkok (TH)

(73) Assignee: QUALCOMM Incorporated, San Diego, CA (US)

( * ) Notice: Subject to any disclaimer, the term of this patent is extended or adjusted under 35 U.S.C. 154(b) by 1937 days.

(21) Appl. No.: 11/431,969

(22) Filed: May 10, 2006

(65) Prior Publication Data

US 2007/0041404 A1    Feb. 22, 2007

Related U.S. Application Data

(60) Provisional application No. 60/706,639, filed on Aug. 8, 2005, provisional application No. 60/710,503, filed on Aug. 22, 2005, provisional application No. 60/710,428, filed on Aug. 22, 2005.

(51) Int. Cl.
*H04B 7/216* (2006.01)
(Continued)

(52) U.S. Cl.
CPC .............. *H04L 5/0021* (2013.01); *H04B 1/692* (2013.01); *H04J 11/00* (2013.01);
(Continued)

(58) Field of Classification Search
USPC ................. 370/342, 307, 320, 321, 436–437, 370/515–516; 455/12.1, 522
See application file for complete search history.

(56) References Cited

U.S. PATENT DOCUMENTS 4,393,276 A    7/1983  Steele
4,554,668 A   11/1985  Deman et al.
(Continued)

FOREIGN PATENT DOCUMENTS

AU    2005319084    4/2010
CA    2348137       11/2001
(Continued)

OTHER PUBLICATIONS

Schnell, M. et al., "Application of IFDMA to Mobile Radio Transmission," Universal Personal Commmunications, 1998, IEEE1998 International Conference, Florence, Italy, Oct. 5-9, 1998, pp. 1267-1272, XP010314992.

(Continued)

*Primary Examiner* — Inder Mehra
(74) *Attorney, Agent, or Firm* — Peng Zhu

(57) ABSTRACT

In a single-carrier frequency division multiple access (SC-FDMA) system that utilizes interleaved FDMA (IFDMA) or localized FDMA (LFDMA), a transmitter generates modulation symbols for different types of data (e.g., traffic data, signaling, and pilot) and performs code division multiplexing (CDM) on at least one data type. For example, the transmitter may apply CDM on signaling and/or pilot sent on frequency subbands and symbol periods that are also used by at least one other transmitter. To apply CDM to a given data type (e.g., signaling), the transmitter performs spreading on the modulation symbols for that data type with an assigned spreading code. CDM may be applied across symbols, samples, samples and symbols, frequency subbands, and so on. The transmitter may perform scrambling after the spreading. The transmitter generates SC-FDMA symbols of the same or different symbol durations for traffic data, signaling, and pilot and transmits the SC-FDMA symbols.

62 Claims, 15 Drawing Sheets

(51) Int. Cl.

| | | |
|---|---|---|
| *H04J 4/00* | (2006.01) | |
| *H04B 7/00* | (2006.01) | |
| *H04L 5/00* | (2006.01) | |
| *H04B 1/692* | (2011.01) | |
| *H04J 11/00* | (2006.01) | |
| *H04L 25/02* | (2006.01) | |
| *H04L 25/03* | (2006.01) | |
| *H04L 27/26* | (2006.01) | |

(52) U.S. Cl.
CPC ........... *H04L 5/0037* (2013.01); *H04L 5/0048* (2013.01); *H04L 25/0226* (2013.01); *H04L 25/03866* (2013.01); *H04L 5/0026* (2013.01); *H04L 25/0204* (2013.01); *H04L 25/0228* (2013.01); *H04L 25/0242* (2013.01); *H04L 27/2613* (2013.01); *H04L 27/2615* (2013.01)
USPC ............ 370/342; 370/320; 370/436; 455/522

(56) References Cited

U.S. PATENT DOCUMENTS

| | | | |
|---|---|---|---|
| 4,747,137 | A | 5/1988 | Matsunaga |
| 4,783,779 | A | 11/1988 | Takahata et al. |
| 4,783,780 | A | 11/1988 | Alexis |
| 4,975,952 | A | 12/1990 | Mabey et al. |
| 5,008,900 | A | 4/1991 | Critchlow et al. |
| 5,115,248 | A | 5/1992 | Roederer et al. |
| 5,268,694 | A | 12/1993 | Jan et al. |
| 5,282,222 | A | 1/1994 | Fattouche et al. |
| 5,363,408 | A | 11/1994 | Paik et al. |
| 5,371,761 | A | 12/1994 | Daffara et al. |
| 5,384,810 | A | 1/1995 | Amrany |
| 5,406,551 | A | 4/1995 | Saito et al. |
| 5,410,538 | A | 4/1995 | Roche et al. |
| 5,455,839 | A | 10/1995 | Eyuboglu |
| 5,465,253 | A | 11/1995 | Rahnema |
| 5,491,727 | A | 2/1996 | Petit |
| 5,513,379 | A | 4/1996 | Benveniste et al. |
| 5,539,748 | A | 7/1996 | Raith et al. |
| 5,548,582 | A | 8/1996 | Brajal et al. |
| 5,583,869 | A | 12/1996 | Grube et al. |
| 5,594,738 | A | 1/1997 | Crisler et al. |
| 5,604,744 | A | 2/1997 | Andersson et al. |
| 5,612,978 | A | 3/1997 | Blanchard et al. |
| 5,625,876 | A | 4/1997 | Gilhousen et al. |
| 5,684,491 | A | 11/1997 | Newman et al. |
| 5,726,978 | A | 3/1998 | Frodigh et al. |
| 5,732,113 | A | 3/1998 | Schmidl et al. |
| 5,745,487 | A | 4/1998 | Hamaki |
| 5,768,276 | A | 6/1998 | Diachina et al. |
| 5,790,537 | A | 8/1998 | Yoon et al. |
| 5,812,938 | A | 9/1998 | Gilhousen et al. |
| 5,815,488 | A | 9/1998 | Williams et al. |
| 5,822,368 | A | 10/1998 | Wang |
| 5,828,650 | A | 10/1998 | Malkamaki et al. |
| 5,838,268 | A | 11/1998 | Frenkel |
| 5,867,478 | A | 2/1999 | Baum et al. |
| 5,870,393 | A | 2/1999 | Yano et al. |
| 5,887,023 | A | 3/1999 | Mabuchi |
| 5,907,585 | A | 5/1999 | Suzuki et al. |
| 5,920,571 | A | 7/1999 | Houck et al. |
| 5,926,470 | A | 7/1999 | Tiedemann, Jr. et al. |
| 5,933,421 | A | 8/1999 | Alamouti et al. |
| 5,949,814 | A | 9/1999 | Odenwalder et al. |
| 5,953,325 | A | 9/1999 | Willars et al. |
| 5,955,992 | A | 9/1999 | Shattil |
| 5,956,642 | A | 9/1999 | Larsson et al. |
| 5,995,992 | A | 11/1999 | Eckard et al. |
| 5,999,826 | A | 12/1999 | Whinnett |
| 6,002,942 | A | 12/1999 | Park et al. |
| 6,016,123 | A | 1/2000 | Barton et al. |
| 6,038,150 | A | 3/2000 | Yee et al. |
| 6,038,263 | A | 3/2000 | Kotzin et al. |
| 6,038,450 | A | 3/2000 | Brink et al. |
| 6,052,364 | A | 4/2000 | Chalmers et al. |
| 6,061,337 | A | 5/2000 | Light et al. |
| 6,067,315 | A | 5/2000 | Sandin |
| 6,075,350 | A | 6/2000 | Peng et al. |
| 6,075,797 | A | 6/2000 | Thomas |
| 6,076,114 | A | 6/2000 | Wesley et al. |
| 6,088,345 | A | 7/2000 | Sakoda et al. |
| 6,088,592 | A | 7/2000 | Doner et al. |
| 6,108,323 | A | 8/2000 | Gray et al. |
| 6,108,550 | A | 8/2000 | Wiorek et al. |
| 6,112,094 | A | 8/2000 | Dent |
| 6,128,776 | A | 10/2000 | Kang et al. |
| 6,138,037 | A | 10/2000 | Jaamies |
| 6,141,317 | A | 10/2000 | Marchok et al. |
| 6,154,484 | A | 11/2000 | Lee et al. |
| 6,169,910 | B1 | 1/2001 | Tamil et al. |
| 6,172,993 | B1 | 1/2001 | Kim et al. |
| 6,175,550 | B1 | 1/2001 | van Nee |
| 6,175,650 | B1 | 1/2001 | Sindhu et al. |
| 6,176,550 | B1 | 1/2001 | Lamart et al. |
| 6,198,775 | B1 | 3/2001 | Khayrallah et al. |
| 6,215,983 | B1 | 4/2001 | Dogan et al. |
| 6,226,280 | B1 | 5/2001 | Roark et al. |
| 6,232,918 | B1 | 5/2001 | Wax et al. |
| 6,240,129 | B1 | 5/2001 | Reusens et al. |
| 6,249,683 | B1 | 6/2001 | Lundby et al. |
| 6,256,478 | B1 | 7/2001 | Allen et al. |
| 6,271,946 | B1 | 8/2001 | Chang et al. |
| 6,272,122 | B1 | 8/2001 | Wee et al. |
| 6,310,704 | B1 | 10/2001 | Dogan et al. |
| 6,317,435 | B1 | 11/2001 | Tiedemann, Jr. et al. |
| 6,335,922 | B1 | 1/2002 | Tiedemann, Jr. et al. |
| 6,337,659 | B1 | 1/2002 | Kim et al. |
| 6,337,983 | B1 | 1/2002 | Bonta et al. |
| 6,353,637 | B1 | 3/2002 | Mansour et al. |
| 6,363,060 | B1 | 3/2002 | Sarkar |
| 6,374,115 | B1 | 4/2002 | Barnes et al. |
| 6,377,539 | B1 | 4/2002 | Kang et al. |
| 6,377,809 | B1 | 4/2002 | Rezaiifar et al. |
| 6,388,998 | B1 | 5/2002 | Kasturia |
| 6,393,008 | B1 | 5/2002 | Cheng et al. |
| 6,393,012 | B1 | 5/2002 | Pankaj |
| 6,401,062 | B1 | 6/2002 | Murashima |
| 6,438,369 | B1 | 8/2002 | Huang et al. |
| 6,449,246 | B1 | 9/2002 | Barton et al. |
| 6,466,800 | B1 | 10/2002 | Sydon et al. |
| 6,473,467 | B1 | 10/2002 | Wallace et al. |
| 6,477,317 | B1 | 11/2002 | Itokawa |
| 6,478,422 | B1 | 11/2002 | Hansen |
| 6,483,820 | B1 | 11/2002 | Davidson et al. |
| 6,487,243 | B1 | 11/2002 | Hwang et al. |
| 6,496,790 | B1 | 12/2002 | Kathavate et al. |
| 6,501,810 | B1 | 12/2002 | Karim et al. |
| 6,507,601 | B2 | 1/2003 | Parsa et al. |
| 6,519,462 | B1 | 2/2003 | Lu et al. |
| 6,529,525 | B1 | 3/2003 | Pecen et al. |
| 6,535,666 | B1 | 3/2003 | Dogan et al. |
| 6,539,008 | B1 | 3/2003 | Ahn et al. |
| 6,539,213 | B1 | 3/2003 | Richards et al. |
| 6,542,485 | B1 | 4/2003 | Mujtaba et al. |
| 6,542,743 | B1 | 4/2003 | Soliman |
| 6,563,806 | B1 | 5/2003 | Yano et al. |
| 6,563,881 | B1 | 5/2003 | Sakoda et al. |
| 6,577,739 | B1 | 6/2003 | Hurting et al. |
| 6,584,140 | B1 | 6/2003 | Lee |
| 6,590,881 | B1 | 7/2003 | Wallace et al. |
| 6,597,746 | B1 | 7/2003 | Amrany et al. |
| 6,601,206 | B1 | 7/2003 | Marvasti |
| 6,614,857 | B1 | 9/2003 | Buehrer et al. |
| 6,625,172 | B2 | 9/2003 | Odenwalder et al. |
| 6,636,568 | B2 | 10/2003 | Kadous |
| 6,654,339 | B1 | 11/2003 | Bohnke et al. |
| 6,654,431 | B1 | 11/2003 | Barton et al. |
| 6,657,949 | B1 | 12/2003 | Jones, IV et al. |
| 6,658,258 | B1 | 12/2003 | Chen et al. |
| 6,674,787 | B1 | 1/2004 | Dick et al. |
| 6,674,810 | B1 | 1/2004 | Cheng |
| 6,675,012 | B2 | 1/2004 | Gray et al. |
| 6,678,318 | B1 | 1/2004 | Lai |

(56) References Cited

U.S. PATENT DOCUMENTS

| | | | |
|---|---|---|---|
| 6,690,951 B1 | 2/2004 | Cuffaro et al. |
| 6,693,952 B1 | 2/2004 | Chuah et al. |
| 6,701,165 B1 | 3/2004 | Ho et al. |
| 6,704,571 B1 | 3/2004 | Moon |
| 6,711,400 B1 | 3/2004 | Aura |
| 6,717,908 B2 | 4/2004 | Vijayan et al. |
| 6,721,568 B1 | 4/2004 | Gustavsson et al. |
| 6,724,719 B1 | 4/2004 | Tong et al. |
| 6,731,602 B1 | 5/2004 | Watanabe et al. |
| 6,735,244 B1 | 5/2004 | Hasegawa et al. |
| 6,744,743 B2 | 6/2004 | Walton et al. |
| 6,748,220 B1 | 6/2004 | Chow et al. |
| 6,751,444 B1 | 6/2004 | Meiyappan |
| 6,751,456 B2 | 6/2004 | Bilgic et al. |
| 6,754,511 B1 | 6/2004 | Halford et al. |
| 6,763,009 B1 | 7/2004 | Bedekar et al. |
| 6,765,969 B1 | 7/2004 | Vook et al. |
| 6,776,165 B2 | 8/2004 | Jin et al. |
| 6,776,765 B2 | 8/2004 | Soukup et al. |
| 6,778,513 B2 | 8/2004 | Kasapi et al. |
| 6,785,341 B2 | 8/2004 | Walton et al. |
| 6,798,736 B1 | 9/2004 | Black et al. |
| 6,799,043 B2 | 9/2004 | Tiedemann, Jr. et al. |
| 6,802,035 B2 | 10/2004 | Catreux et al. |
| 6,804,307 B1 | 10/2004 | Popovic |
| 6,813,284 B2 | 11/2004 | Vayanos et al. |
| 6,821,535 B2 | 11/2004 | Nurmi et al. |
| 6,828,293 B1 | 12/2004 | Hazenkamp et al. |
| 6,829,293 B2 | 12/2004 | Jones et al. |
| 6,831,943 B1 | 12/2004 | Dabak et al. |
| 6,842,487 B1 | 1/2005 | Larsson |
| 6,850,481 B2 | 2/2005 | Wu et al. |
| 6,850,509 B2 | 2/2005 | Lee et al. |
| 6,862,271 B2 | 3/2005 | Medvedev et al. |
| 6,870,808 B1 | 3/2005 | Liu et al. |
| 6,870,826 B1 | 3/2005 | Ishizu |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |
| 6,909,707 B2 | 6/2005 | Rotstein et al. |
| 6,909,797 B2 | 6/2005 | Romsdahl et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia |
| 6,934,266 B2 | 8/2005 | Dulin et al. |
| 6,934,275 B1 | 8/2005 | Love et al. |
| 6,934,340 B1 | 8/2005 | Dollard et al. |
| 6,940,842 B2 | 9/2005 | Proctor, Jr. |
| 6,940,845 B2 | 9/2005 | Benveniste et al. |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,466 B1 | 1/2006 | Yun et al. |
| 6,985,498 B2 | 1/2006 | Laroia et al. |
| 6,987,746 B1 | 1/2006 | Song |
| 6,993,342 B2 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling et al. |
| 7,009,500 B2 | 3/2006 | Rao et al. |
| 7,010,048 B1 | 3/2006 | Shattil |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem |
| 7,020,110 B2 | 3/2006 | Walton et al. |
| 7,023,880 B2 | 4/2006 | El-Maleh et al. |
| 7,039,356 B2 | 5/2006 | Nguyen et al. |
| 7,039,370 B2 | 5/2006 | Laroia et al. |
| 7,042,856 B2 | 5/2006 | Walton et al. |
| 7,042,857 B2 | 5/2006 | Krishnan et al. |
| 7,047,006 B2 | 5/2006 | Classon et al. |
| 7,050,402 B2 | 5/2006 | Schmidl et al. |
| 7,050,405 B2 | 5/2006 | Attar et al. |
| 7,050,759 B2 | 5/2006 | Gaal et al. |
| 7,054,301 B1 | 5/2006 | Sousa et al. |
| 7,061,898 B2 | 6/2006 | Hashem et al. |
| 7,069,009 B2 | 6/2006 | Li et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,095,709 B2 | 8/2006 | Walton et al. |
| 7,099,299 B2 | 8/2006 | Liang et al. |
| 7,099,630 B2 | 8/2006 | Brunner et al. |
| 7,103,384 B2 | 9/2006 | Chun et al. |
| 7,106,319 B2 | 9/2006 | Ishiyama |
| 7,113,808 B2 | 9/2006 | Hwang et al. |
| 7,120,134 B2 | 10/2006 | Tiedemann, Jr. et al. |
| 7,120,395 B2 | 10/2006 | Tong et al. |
| 7,126,928 B2 | 10/2006 | Tiedemann, Jr. et al. |
| 7,131,086 B2 | 10/2006 | Yamasaki et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore et al. |
| 7,145,959 B2 | 12/2006 | Harel et al. |
| 7,149,199 B2 | 12/2006 | Sung et al. |
| 7,149,238 B2 | 12/2006 | Agee et al. |
| 7,151,761 B1 | 12/2006 | Palenius et al. |
| 7,151,936 B2 | 12/2006 | Wager et al. |
| 7,154,936 B2 | 12/2006 | Bjerke et al. |
| 7,155,236 B2 | 12/2006 | Chen et al. |
| 7,157,351 B2 | 1/2007 | Cheng et al. |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,184,713 B2 | 2/2007 | Kadous et al. |
| 7,188,300 B2 | 3/2007 | Eriksson et al. |
| 7,197,282 B2 | 3/2007 | Dent et al. |
| 7,209,712 B2 | 4/2007 | Holtzman et al. |
| 7,215,979 B2 | 5/2007 | Nakagawa et al. |
| 7,230,942 B2 | 6/2007 | Laroia et al. |
| 7,233,634 B1 | 6/2007 | Hassell Sweatman et al. |
| 7,236,747 B1 | 6/2007 | Meacham et al. |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal et al. |
| 7,257,167 B2 | 8/2007 | Lau et al. |
| 7,257,406 B2 | 8/2007 | Ji et al. |
| 7,257,423 B2 | 8/2007 | Iochi et al. |
| 7,260,153 B2 | 8/2007 | Nissani et al. |
| 7,280,467 B2 | 10/2007 | Smee et al. |
| 7,289,570 B2 | 10/2007 | Schmidl et al. |
| 7,289,585 B2 | 10/2007 | Sandhu et al. |
| 7,290,195 B2 | 10/2007 | Guo et al. |
| 7,292,651 B2 | 11/2007 | Li |
| 7,292,863 B2 | 11/2007 | Chen et al. |
| 7,295,509 B2 | 11/2007 | Laroia et al. |
| 7,313,086 B2 | 12/2007 | Aizawa |
| 7,313,126 B2 | 12/2007 | Yun et al. |
| 7,313,174 B2 | 12/2007 | Alard et al. |
| 7,313,407 B2 | 12/2007 | Shapira |
| 7,327,812 B2 | 2/2008 | Auer |

(56) References Cited

U.S. PATENT DOCUMENTS

| | | |
|---|---|---|
| 7,330,701 B2 | 2/2008 | Mukkavilli et al. |
| 7,336,727 B2 | 2/2008 | Mukkavilli et al. |
| 7,349,371 B2 | 3/2008 | Schein et al. |
| 7,349,667 B2 | 3/2008 | Magee et al. |
| 7,356,000 B2 | 4/2008 | Oprescu-Surcobe et al. |
| 7,356,005 B2 | 4/2008 | Derryberry et al. |
| 7,356,073 B2 | 4/2008 | Heikkila |
| 7,359,327 B2 | 4/2008 | Oshiba |
| 7,363,055 B2 | 4/2008 | Castrogiovanni et al. |
| 7,366,223 B1 | 4/2008 | Chen et al. |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara et al. |
| 7,392,014 B2 | 6/2008 | Baker et al. |
| 7,394,865 B2 | 7/2008 | Borran et al. |
| 7,403,745 B2 | 7/2008 | Dominique et al. |
| 7,403,748 B1 | 7/2008 | Keskitalo et al. |
| 7,406,119 B2 | 7/2008 | Yamano et al. |
| 7,406,336 B2 | 7/2008 | Astely et al. |
| 7,411,898 B2 | 8/2008 | Erlich et al. |
| 7,412,212 B2 | 8/2008 | Hottinen et al. |
| 7,418,043 B2 | 8/2008 | Shattil |
| 7,418,246 B2 | 8/2008 | Kim et al. |
| 7,423,991 B2 | 9/2008 | Cho et al. |
| 7,426,426 B2 | 9/2008 | Van Baren et al. |
| 7,428,426 B2 | 9/2008 | Kiran et al. |
| 7,433,661 B2 | 10/2008 | Kogiantis et al. |
| 7,437,164 B2 | 10/2008 | Agrawal et al. |
| 7,443,835 B2 | 10/2008 | Lakshmi Narayanan et al. |
| 7,447,270 B1 | 11/2008 | Hottinen et al. |
| 7,450,532 B2 | 11/2008 | Chae et al. |
| 7,450,548 B2 | 11/2008 | Haustein et al. |
| 7,460,466 B2 | 12/2008 | Lee et al. |
| 7,463,698 B2 | 12/2008 | Fujii et al. |
| 7,468,943 B2 | 12/2008 | Gu et al. |
| 7,469,011 B2 | 12/2008 | Lin et al. |
| 7,471,963 B2 | 12/2008 | Kim et al. |
| 7,483,408 B2 | 1/2009 | Bevan et al. |
| 7,483,719 B2 | 1/2009 | Kim et al. |
| 7,486,408 B2 | 2/2009 | Van Der Schaar et al. |
| 7,486,735 B2 | 2/2009 | Dubuc et al. |
| 7,492,788 B2 | 2/2009 | Zhang et al. |
| 7,499,393 B2 | 3/2009 | Ozluturk et al. |
| 7,508,748 B2 | 3/2009 | Kadous |
| 7,508,842 B2 | 3/2009 | Baum et al. |
| 7,512,096 B2 | 3/2009 | Kuzminskiy et al. |
| 7,545,867 B1 | 6/2009 | Lou et al. |
| 7,548,506 B2 | 6/2009 | Ma et al. |
| 7,551,546 B2 | 6/2009 | Ma et al. |
| 7,551,564 B2 | 6/2009 | Mattina |
| 7,558,293 B2 | 7/2009 | Choi et al. |
| 7,567,621 B2 | 7/2009 | Sampath et al. |
| 7,573,900 B2 | 8/2009 | Kim et al. |
| 7,599,327 B2 | 10/2009 | Zhuang |
| 7,616,955 B2 | 11/2009 | Kim et al. |
| 7,627,051 B2 | 12/2009 | Shen et al. |
| 7,664,061 B2 | 2/2010 | Hottinen |
| 7,676,007 B1 | 3/2010 | Choi et al. |
| 7,684,507 B2 | 3/2010 | Levy |
| 7,724,777 B2 | 5/2010 | Sutivong et al. |
| 7,768,979 B2 | 8/2010 | Sutivong et al. |
| 7,899,497 B2 | 3/2011 | Kish et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,045,512 B2 | 10/2011 | Khandekar et al. |
| 8,095,141 B2 | 1/2012 | Teague |
| 8,098,568 B2 | 1/2012 | Laroia et al. |
| 8,098,569 B2 | 1/2012 | Laroia et al. |
| 8,199,634 B2 | 6/2012 | Laroia et al. |
| 8,218,425 B2 | 7/2012 | Laroia et al. |
| 8,223,627 B2 | 7/2012 | Laroia et al. |
| 8,295,154 B2 | 10/2012 | Laroia et al. |
| 8,462,859 B2 | 6/2013 | Sampath et al. |
| 8,477,684 B2 | 7/2013 | Khandekar et al. |
| 8,582,509 B2 | 11/2013 | Khandekar et al. |
| 8,582,548 B2 | 11/2013 | Gore et al. |
| 2001/0021650 A1 | 9/2001 | Bilgic et al. |
| 2001/0024427 A1 | 9/2001 | Suzuki |
| 2001/0030948 A1 | 10/2001 | Tiedemann, Jr. |
| 2001/0047424 A1 | 11/2001 | Alastalo et al. |
| 2001/0053140 A1 | 12/2001 | Choi et al. |
| 2001/0055294 A1 | 12/2001 | Motoyoshi et al. |
| 2001/0055297 A1 | 12/2001 | Benveniste et al. |
| 2002/0000948 A1 | 1/2002 | Chun et al. |
| 2002/0015405 A1 | 2/2002 | Sepponen et al. |
| 2002/0018157 A1 | 2/2002 | Zhang et al. |
| 2002/0039912 A1 | 4/2002 | Yamaguchi et al. |
| 2002/0044524 A1 | 4/2002 | Laroia et al. |
| 2002/0058525 A1 | 5/2002 | Kasapi et al. |
| 2002/0061742 A1 | 5/2002 | Lapaille et al. |
| 2002/0077152 A1 | 6/2002 | Johnson et al. |
| 2002/0085521 A1 | 7/2002 | Tripathi et al. |
| 2002/0090004 A1 | 7/2002 | Rinchiuso |
| 2002/0090024 A1 | 7/2002 | Tan et al. |
| 2002/0101839 A1 | 8/2002 | Farley et al. |
| 2002/0122381 A1 | 9/2002 | Wu et al. |
| 2002/0122403 A1 | 9/2002 | Hashem et al. |
| 2002/0128035 A1 | 9/2002 | Jokinen et al. |
| 2002/0147953 A1 | 10/2002 | Catreux et al. |
| 2002/0159422 A1 | 10/2002 | Li et al. |
| 2002/0160769 A1 | 10/2002 | Gray et al. |
| 2002/0160781 A1 | 10/2002 | Bark et al. |
| 2002/0168946 A1 | 11/2002 | Aizawa et al. |
| 2002/0172293 A1 | 11/2002 | Kuchi et al. |
| 2002/0176398 A1 | 11/2002 | Nidda |
| 2002/0181571 A1 | 12/2002 | Yamano et al. |
| 2002/0193146 A1 | 12/2002 | Wallace et al. |
| 2003/0002464 A1 | 1/2003 | Rezaiifar et al. |
| 2003/0020651 A1 | 1/2003 | Crilly, Jr. et al. |
| 2003/0027579 A1 | 2/2003 | Sydon |
| 2003/0035491 A1 | 2/2003 | Walton et al. |
| 2003/0036359 A1 | 2/2003 | Dent et al. |
| 2003/0040283 A1 | 2/2003 | Kawai et al. |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072254 A1 | 4/2003 | Ma et al. |
| 2003/0072255 A1 | 4/2003 | Ma et al. |
| 2003/0072280 A1 | 4/2003 | McFarland et al. |
| 2003/0072395 A1 | 4/2003 | Jia et al. |
| 2003/0073409 A1 | 4/2003 | Nobukiyo et al. |
| 2003/0073464 A1 | 4/2003 | Giannakis et al. |
| 2003/0076890 A1 | 4/2003 | Hochwald et al. |
| 2003/0086371 A1 | 5/2003 | Walton et al. |
| 2003/0086393 A1 | 5/2003 | Vasudevan et al. |
| 2003/0096579 A1 | 5/2003 | Ito et al. |
| 2003/0103520 A1 | 6/2003 | Chen et al. |
| 2003/0109266 A1 | 6/2003 | Rafiah et al. |
| 2003/0112745 A1 | 6/2003 | Zhuang et al. |
| 2003/0123414 A1 | 7/2003 | Tong et al. |
| 2003/0125040 A1 | 7/2003 | Walton et al. |
| 2003/0128658 A1 | 7/2003 | Walton et al. |
| 2003/0133426 A1 | 7/2003 | Schein et al. |
| 2003/0142648 A1 | 7/2003 | Semper |
| 2003/0142729 A1 | 7/2003 | Subrahmanya et al. |
| 2003/0147371 A1 | 8/2003 | Choi et al. |
| 2003/0161281 A1 | 8/2003 | Dulin et al. |
| 2003/0161282 A1 | 8/2003 | Medvedev et al. |
| 2003/0165189 A1 | 9/2003 | Kadous et al. |
| 2003/0181170 A1 | 9/2003 | Sim |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0202560 A1 | 10/2003 | Tiedemann, Jr. et al. |
| 2003/0216156 A1 | 11/2003 | Chun et al. |
| 2003/0228850 A1 | 12/2003 | Hwang |

(56) References Cited

U.S. PATENT DOCUMENTS

| | | |
|---|---|---|
| 2003/0235255 A1 | 12/2003 | Ketchum et al. |
| 2004/0001429 A1 | 1/2004 | Ma et al. |
| 2004/0001460 A1 | 1/2004 | Bevan et al. |
| 2004/0002364 A1 | 1/2004 | Trikkonen et al. |
| 2004/0009783 A1 | 1/2004 | Miyoshi |
| 2004/0010623 A1 | 1/2004 | Sher et al. |
| 2004/0015692 A1 | 1/2004 | Green et al. |
| 2004/0017785 A1 | 1/2004 | Zelst et al. |
| 2004/0032443 A1 | 2/2004 | Moylan et al. |
| 2004/0042558 A1 | 3/2004 | Hwang et al. |
| 2004/0048609 A1 | 3/2004 | Kosaka et al. |
| 2004/0048630 A1 | 3/2004 | Shapira et al. |
| 2004/0054999 A1 | 3/2004 | Willen et al. |
| 2004/0057394 A1 | 3/2004 | Holtzman et al. |
| 2004/0058687 A1 | 3/2004 | Kim et al. |
| 2004/0066754 A1 | 4/2004 | Hottinen et al. |
| 2004/0066761 A1 | 4/2004 | Giannakis et al. |
| 2004/0066772 A1 | 4/2004 | Moon et al. |
| 2004/0067756 A1 | 4/2004 | Wager et al. |
| 2004/0072565 A1 | 4/2004 | Nobukiyo et al. |
| 2004/0076185 A1 | 4/2004 | Kim et al. |
| 2004/0077345 A1 | 4/2004 | Turner et al. |
| 2004/0077379 A1 | 4/2004 | Smith et al. |
| 2004/0081073 A1 | 4/2004 | Walton et al. |
| 2004/0087325 A1 | 5/2004 | Cheng et al. |
| 2004/0095907 A1 | 5/2004 | Agee et al. |
| 2004/0097215 A1 | 5/2004 | Abe et al. |
| 2004/0097240 A1 | 5/2004 | Chen et al. |
| 2004/0098505 A1 | 5/2004 | Clemmensen et al. |
| 2004/0105489 A1 | 6/2004 | Kim et al. |
| 2004/0114618 A1 | 6/2004 | Tong et al. |
| 2004/0120411 A1 | 6/2004 | Walton et al. |
| 2004/0125792 A1 | 7/2004 | Bradbury et al. |
| 2004/0128605 A1 | 7/2004 | Sibecas et al. |
| 2004/0131007 A1 | 7/2004 | Smee et al. |
| 2004/0131008 A1 | 7/2004 | Zuniga et al. |
| 2004/0131038 A1 | 7/2004 | Kim et al. |
| 2004/0131110 A1 | 7/2004 | Alard et al. |
| 2004/0136344 A1 | 7/2004 | Kim et al. |
| 2004/0156328 A1 | 8/2004 | Walton et al. |
| 2004/0160914 A1 | 8/2004 | Sarkar et al. |
| 2004/0160933 A1 | 8/2004 | Odenwalder et al. |
| 2004/0162083 A1 | 8/2004 | Chen et al. |
| 2004/0165564 A1 | 8/2004 | Kim et al. |
| 2004/0166867 A1 | 8/2004 | Hawe et al. |
| 2004/0166887 A1 | 8/2004 | Laroia et al. |
| 2004/0170152 A1 | 9/2004 | Nagao et al. |
| 2004/0170157 A1 | 9/2004 | Kim et al. |
| 2004/0171384 A1* | 9/2004 | Holma et al. ................. 455/436 |
| 2004/0171385 A1 | 9/2004 | Haustein et al. |
| 2004/0178954 A1 | 9/2004 | Vook et al. |
| 2004/0179480 A1 | 9/2004 | Attar et al. |
| 2004/0179494 A1 | 9/2004 | Attar et al. |
| 2004/0179506 A1 | 9/2004 | Padovani et al. |
| 2004/0179627 A1 | 9/2004 | Ketchum et al. |
| 2004/0181569 A1 | 9/2004 | Attar et al. |
| 2004/0185792 A1 | 9/2004 | Alexiou et al. |
| 2004/0190640 A1 | 9/2004 | Dubuc et al. |
| 2004/0202257 A1 | 10/2004 | Mehta et al. |
| 2004/0208138 A1 | 10/2004 | Hayashi et al. |
| 2004/0218520 A1 | 11/2004 | Aizawa et al. |
| 2004/0219819 A1 | 11/2004 | Di Mascio et al. |
| 2004/0219919 A1 | 11/2004 | Whinnett et al. |
| 2004/0224711 A1 | 11/2004 | Panchal et al. |
| 2004/0228267 A1 | 11/2004 | Agrawal et al. |
| 2004/0228313 A1 | 11/2004 | Cheng et al. |
| 2004/0229615 A1 | 11/2004 | Agrawal et al. |
| 2004/0240419 A1 | 12/2004 | Abrishamkar et al. |
| 2004/0240572 A1 | 12/2004 | Brutel et al. |
| 2004/0248604 A1 | 12/2004 | Vaidyanathan et al. |
| 2004/0252529 A1 | 12/2004 | Huber et al. |
| 2004/0252629 A1 | 12/2004 | Hasegawa et al. |
| 2004/0252655 A1 | 12/2004 | Lim et al. |
| 2004/0252662 A1 | 12/2004 | Cho |
| 2004/0257979 A1 | 12/2004 | Ro et al. |
| 2004/0264507 A1 | 12/2004 | Cho et al. |
| 2004/0264585 A1 | 12/2004 | Borran et al. |
| 2004/0264593 A1 | 12/2004 | Shim et al. |
| 2005/0002412 A1 | 1/2005 | Sagfors et al. |
| 2005/0002440 A1 | 1/2005 | Alamouti et al. |
| 2005/0002467 A1 | 1/2005 | Seo et al. |
| 2005/0002468 A1 | 1/2005 | Walton et al. |
| 2005/0003782 A1 | 1/2005 | Wintzell |
| 2005/0008091 A1 | 1/2005 | Boutros et al. |
| 2005/0009486 A1 | 1/2005 | Al-Dhahir et al. |
| 2005/0013263 A1 | 1/2005 | Kim et al. |
| 2005/0025093 A1 | 2/2005 | Yun et al. |
| 2005/0030886 A1 | 2/2005 | Wu et al. |
| 2005/0030964 A1 | 2/2005 | Tiedemann, Jr. et al. |
| 2005/0034079 A1 | 2/2005 | Gunasekar et al. |
| 2005/0041611 A1 | 2/2005 | Sandhu et al. |
| 2005/0041618 A1 | 2/2005 | Wei et al. |
| 2005/0041750 A1 | 2/2005 | Lau et al. |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0052991 A1 | 3/2005 | Kadous et al. |
| 2005/0053081 A1 | 3/2005 | Andersson et al. |
| 2005/0053151 A1 | 3/2005 | Lin et al. |
| 2005/0063298 A1 | 3/2005 | Ling et al. |
| 2005/0068921 A1 | 3/2005 | Liu |
| 2005/0073976 A1 | 4/2005 | Fujii |
| 2005/0085195 A1 | 4/2005 | Tong et al. |
| 2005/0085236 A1 | 4/2005 | Gerlach et al. |
| 2005/0111397 A1 | 5/2005 | Attar et al. |
| 2005/0113100 A1 | 5/2005 | Oprescu-Surcobe et al. |
| 2005/0122898 A1 | 6/2005 | Jang et al. |
| 2005/0128683 A1 | 6/2005 | Watanabe et al. |
| 2005/0128983 A1 | 6/2005 | Kim et al. |
| 2005/0135324 A1 | 6/2005 | Kim et al. |
| 2005/0135498 A1 | 6/2005 | Yee |
| 2005/0141624 A1 | 6/2005 | Lakshmipathi et al. |
| 2005/0147024 A1 | 7/2005 | Jung et al. |
| 2005/0147025 A1 | 7/2005 | Auer et al. |
| 2005/0152484 A1 | 7/2005 | Sandhu et al. |
| 2005/0157807 A1 | 7/2005 | Shim et al. |
| 2005/0159162 A1 | 7/2005 | Park |
| 2005/0164709 A1 | 7/2005 | Balasubramanian et al. |
| 2005/0165949 A1 | 7/2005 | Teague |
| 2005/0174981 A1 | 8/2005 | Heath, Jr. et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0181799 A1 | 8/2005 | Laroia et al. |
| 2005/0192011 A1 | 9/2005 | Hong et al. |
| 2005/0195733 A1 | 9/2005 | Walton et al. |
| 2005/0195852 A1 | 9/2005 | Vayanos et al. |
| 2005/0195886 A1 | 9/2005 | Lampinen et al. |
| 2005/0201296 A1 | 9/2005 | Vannithamby et al. |
| 2005/0204247 A1 | 9/2005 | Guo et al. |
| 2005/0207367 A1 | 9/2005 | Onggosanusi et al. |
| 2005/0215196 A1 | 9/2005 | Krishnan et al. |
| 2005/0215251 A1 | 9/2005 | Krishnan et al. |
| 2005/0226204 A1 | 10/2005 | Uehara et al. |
| 2005/0239465 A1 | 10/2005 | Lee et al. |
| 2005/0243791 A1 | 11/2005 | Park et al. |
| 2005/0246548 A1 | 11/2005 | Laitinen |
| 2005/0249266 A1 | 11/2005 | Brown et al. |
| 2005/0254416 A1 | 11/2005 | Laroia et al. |
| 2005/0254467 A1 | 11/2005 | Li et al. |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard et al. |
| 2005/0259757 A1* | 11/2005 | Wu et al. ................. 375/260 |
| 2005/0265220 A1 | 12/2005 | Erlich et al. |
| 2005/0265293 A1* | 12/2005 | Ro et al. ................. 370/335 |
| 2005/0265470 A1 | 12/2005 | Kishigami et al. |
| 2005/0271012 A1 | 12/2005 | Agrawal et al. |
| 2005/0276347 A1 | 12/2005 | Mujtaba et al. |
| 2005/0276348 A1 | 12/2005 | Vandenameele |
| 2005/0277423 A1 | 12/2005 | Sandhu et al. |
| 2005/0281029 A1 | 12/2005 | Inamoto et al. |
| 2005/0281290 A1 | 12/2005 | Khandekar et al. |

(56) References Cited

U.S. PATENT DOCUMENTS

| | | | |
|---|---|---|---|
| 2005/0282500 A1 | 12/2005 | Wang et al. |
| 2005/0286408 A1 | 12/2005 | Jin et al. |
| 2005/0289256 A1 | 12/2005 | Cudak et al. |
| 2006/0002451 A1 | 1/2006 | Fukuta et al. |
| 2006/0013285 A1 | 1/2006 | Kobayashi et al. |
| 2006/0018336 A1 | 1/2006 | Sutivong et al. |
| 2006/0018347 A1 | 1/2006 | Agrawal et al. |
| 2006/0018397 A1 | 1/2006 | Sampath et al. |
| 2006/0026344 A1 | 2/2006 | Sun Hsu et al. |
| 2006/0029289 A1 | 2/2006 | Yamaguchi et al. |
| 2006/0034164 A1 | 2/2006 | Ozluturk et al. |
| 2006/0034173 A1 | 2/2006 | Teague et al. |
| 2006/0039332 A1 | 2/2006 | Kotzin |
| 2006/0039344 A1 | 2/2006 | Khan |
| 2006/0039500 A1 | 2/2006 | Yun et al. |
| 2006/0040655 A1 | 2/2006 | Kim et al. |
| 2006/0045003 A1 | 3/2006 | Choi et al. |
| 2006/0050770 A1 | 3/2006 | Wallace et al. |
| 2006/0056340 A1 | 3/2006 | Hottinen et al. |
| 2006/0057958 A1 | 3/2006 | Ngo et al. |
| 2006/0067421 A1 | 3/2006 | Walton et al. |
| 2006/0078075 A1 | 4/2006 | Stamoulis et al. |
| 2006/0083159 A1 | 4/2006 | Laroia et al. |
| 2006/0083183 A1 | 4/2006 | Teague et al. |
| 2006/0092054 A1 | 5/2006 | Li et al. |
| 2006/0093065 A1 | 5/2006 | Thomas et al. |
| 2006/0104333 A1 | 5/2006 | Rainbolt et al. |
| 2006/0104381 A1 | 5/2006 | Menon et al. |
| 2006/0109814 A1 | 5/2006 | Kuzminskiy et al. |
| 2006/0111054 A1 | 5/2006 | Pan et al. |
| 2006/0111148 A1 | 5/2006 | Mukkavilli et al. |
| 2006/0114858 A1 | 6/2006 | Walton et al. |
| 2006/0120469 A1 | 6/2006 | Maltsev et al. |
| 2006/0120471 A1 | 6/2006 | Learned et al. |
| 2006/0126491 A1 | 6/2006 | Ro et al. |
| 2006/0133269 A1 | 6/2006 | Prakash et al. |
| 2006/0133455 A1 | 6/2006 | Agrawal et al. |
| 2006/0133521 A1 | 6/2006 | Sampath et al. |
| 2006/0140289 A1 | 6/2006 | Mandyam et al. |
| 2006/0153239 A1 | 7/2006 | Julian et al. |
| 2006/0155534 A1 | 7/2006 | Lin et al. |
| 2006/0156199 A1 | 7/2006 | Palanki et al. |
| 2006/0172704 A1 | 8/2006 | Nishio et al. |
| 2006/0189321 A1 | 8/2006 | Oh et al. |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209732 A1 | 9/2006 | Gorokhov et al. |
| 2006/0209754 A1 | 9/2006 | Ji et al. |
| 2006/0209764 A1 | 9/2006 | Kim et al. |
| 2006/0209973 A1 | 9/2006 | Gorokhov et al. |
| 2006/0215777 A1 | 9/2006 | Krishnamoorthi |
| 2006/0218459 A1 | 9/2006 | Hedberg |
| 2006/0223449 A1 | 10/2006 | Sampath et al. |
| 2006/0233124 A1 | 10/2006 | Palanki |
| 2006/0233131 A1 | 10/2006 | Gore et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0280114 A1 | 12/2006 | Osseiran et al. |
| 2006/0285485 A1 | 12/2006 | Agrawal et al. |
| 2006/0285515 A1 | 12/2006 | Julian et al. |
| 2006/0286974 A1 | 12/2006 | Gore et al. |
| 2006/0286982 A1 | 12/2006 | Prakash et al. |
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0005749 A1 | 1/2007 | Sampath |
| 2007/0009011 A1* | 1/2007 | Coulson ............... 375/144 |
| 2007/0019596 A1 | 1/2007 | Barriac et al. |
| 2007/0025345 A1 | 2/2007 | Bachl et al. |
| 2007/0041311 A1 | 2/2007 | Baum et al. |
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0049218 A1 | 3/2007 | Gorokhov et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1 | 3/2007 | Classon et al. |
| 2007/0070952 A1 | 3/2007 | Yoon et al. |
| 2007/0071147 A1 | 3/2007 | Sampath et al. |
| 2007/0097853 A1 | 5/2007 | Khandekar et al. |
| 2007/0097889 A1 | 5/2007 | Wang et al. |
| 2007/0097897 A1 | 5/2007 | Teague et al. |
| 2007/0097908 A1 | 5/2007 | Khandekar et al. |
| 2007/0097909 A1 | 5/2007 | Khandekar et al. |
| 2007/0097910 A1 | 5/2007 | Ji et al. |
| 2007/0097922 A1 | 5/2007 | Parekh et al. |
| 2007/0097927 A1 | 5/2007 | Gorokhov et al. |
| 2007/0097942 A1 | 5/2007 | Gorokhov et al. |
| 2007/0097981 A1 | 5/2007 | Papasakellariou et al. |
| 2007/0098050 A1 | 5/2007 | Khandekar et al. |
| 2007/0098120 A1 | 5/2007 | Wang et al. |
| 2007/0099666 A1 | 5/2007 | Astely et al. |
| 2007/0110172 A1 | 5/2007 | Faulkner et al. |
| 2007/0115795 A1 | 5/2007 | Gore et al. |
| 2007/0149194 A1 | 6/2007 | Das et al. |
| 2007/0149228 A1 | 6/2007 | Das |
| 2007/0159969 A1 | 7/2007 | Das et al. |
| 2007/0160115 A1 | 7/2007 | Palanki et al. |
| 2007/0165738 A1 | 7/2007 | Barriac et al. |
| 2007/0177631 A1 | 8/2007 | Popovic et al. |
| 2007/0177681 A1 | 8/2007 | Choi et al. |
| 2007/0183303 A1 | 8/2007 | Pi et al. |
| 2007/0183386 A1* | 8/2007 | Muharemovic et al. ...... 370/344 |
| 2007/0207812 A1 | 9/2007 | Borran et al. |
| 2007/0211616 A1 | 9/2007 | Khandekar et al. |
| 2007/0211667 A1 | 9/2007 | Agrawal et al. |
| 2007/0230324 A1 | 10/2007 | Li et al. |
| 2007/0242653 A1 | 10/2007 | Yang et al. |
| 2007/0263743 A1 | 11/2007 | Lee et al. |
| 2007/0280336 A1* | 12/2007 | Zhang et al. ................. 375/148 |
| 2007/0281702 A1 | 12/2007 | Lim et al. |
| 2008/0039129 A1 | 2/2008 | Li et al. |
| 2008/0063099 A1 | 3/2008 | Laroia et al. |
| 2008/0095223 A1 | 4/2008 | Tong et al. |
| 2008/0095262 A1* | 4/2008 | Ho et al. ....................... 375/295 |
| 2008/0151829 A1 | 6/2008 | Khandekar et al. |
| 2008/0181139 A1 | 7/2008 | Rangarajan et al. |
| 2008/0214222 A1 | 9/2008 | Atarashi et al. |
| 2008/0253279 A1 | 10/2008 | Ma et al. |
| 2008/0267157 A1* | 10/2008 | Lee et al. ...................... 370/342 |
| 2008/0299983 A1 | 12/2008 | Kwak et al. |
| 2009/0003466 A1 | 1/2009 | Taherzadehboroujeni et al. |
| 2009/0010351 A1 | 1/2009 | Laroia et al. |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0180459 A1* | 7/2009 | Orlik et al. ..................... 370/344 |
| 2009/0197646 A1 | 8/2009 | Tamura et al. |
| 2009/0201826 A1 | 8/2009 | Gorokhov et al. |
| 2009/0201872 A1 | 8/2009 | Gorokhov et al. |
| 2009/0213750 A1 | 8/2009 | Gorokhov et al. |
| 2009/0213950 A1 | 8/2009 | Gorokhov et al. |
| 2009/0262641 A1 | 10/2009 | Laroia et al. |
| 2009/0262699 A1* | 10/2009 | Wengerter et al. ............ 370/330 |
| 2009/0285163 A1 | 11/2009 | Zhang et al. |
| 2009/0287977 A1 | 11/2009 | Chang et al. |
| 2010/0002570 A9 | 1/2010 | Walton et al. |
| 2010/0135242 A1 | 6/2010 | Nam et al. |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0064070 A1 | 3/2011 | Gore et al. |
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0255518 A9 | 10/2011 | Agrawal et al. |

(56) References Cited

U.S. PATENT DOCUMENTS

| | | |
|---|---|---|
| 2011/0306291 A1 | 12/2011 | Ma et al. |
| 2012/0002623 A1 | 1/2012 | Khandekar et al. |
| 2012/0063441 A1 | 3/2012 | Palanki |
| 2012/0120925 A1 | 5/2012 | Kadous et al. |
| 2012/0140798 A1 | 6/2012 | Kadous et al. |
| 2012/0140838 A1 | 6/2012 | Kadous et al. |
| 2013/0016678 A1 | 1/2013 | Laroia et al. |
| 2013/0208681 A1 | 8/2013 | Gore et al. |
| 2013/0287138 A1 | 10/2013 | Ma et al. |
| 2013/0315200 A1 | 11/2013 | Gorokhov et al. |

FOREIGN PATENT DOCUMENTS

| | | |
|---|---|---|
| CA | 2477536 | 9/2003 |
| CA | 2540688 | 5/2005 |
| CA | 2577369 | 3/2006 |
| CL | 19931400 | 12/1994 |
| CL | 1997846 | 1/1998 |
| CL | 009531997 | 1/1998 |
| CL | 27102004 | 8/2005 |
| CL | 22892004 | 9/2005 |
| CL | 30862004 | 10/2005 |
| CL | 29932005 | 5/2006 |
| CL | 15202006 | 12/2006 |
| CL | 22032006 | 2/2007 |
| CL | 15212006 | 3/2007 |
| CL | 14922006 | 4/2007 |
| CL | 14892006 | 5/2007 |
| CL | 14902006 | 5/2007 |
| CL | 29032006 | 5/2007 |
| CL | 29062006 | 5/2007 |
| CL | 29042006 | 6/2007 |
| CL | 33882005 | 6/2007 |
| CL | 29022006 | 7/2007 |
| CL | 29082006 | 10/2007 |
| CL | 29012006 | 1/2010 |
| CL | 29072006 | 1/2010 |
| CN | 1252919 | 5/2000 |
| CN | 1267437 | 9/2000 |
| CN | 1267437 A | 9/2000 |
| CN | 1284795 | 2/2001 |
| CN | 1296682 | 5/2001 |
| CN | 1344451 | 4/2002 |
| CN | 1344451 A | 4/2002 |
| CN | 1346221 | 4/2002 |
| CN | 1383631 | 12/2002 |
| CN | 1386344 | 12/2002 |
| CN | 1402916 A | 3/2003 |
| CN | 1424835 | 6/2003 |
| CN | 1132474 C | 12/2003 |
| CN | 1467938 A | 1/2004 |
| CN | 1487755 A | 4/2004 |
| CN | 1520220 | 8/2004 |
| CN | 1525678 | 9/2004 |
| CN | 1636346 | 7/2005 |
| CN | 1642051 A | 7/2005 |
| CN | 1642335 A | 7/2005 |
| CN | 1647436 | 7/2005 |
| DE | 19800653 A1 | 7/1999 |
| DE | 19800953 C1 | 7/1999 |
| DE | 19957288 C1 | 5/2001 |
| DE | 10240138 | 8/2003 |
| DE | 10254384 | 6/2004 |
| EP | 0488976 | 6/1992 |
| EP | 0568291 A2 | 11/1993 |
| EP | 0740431 A1 | 10/1996 |
| EP | 0786889 | 7/1997 |
| EP | 0805576 A2 | 11/1997 |
| EP | 0807989 A1 | 11/1997 |
| EP | 0844796 A2 | 5/1998 |
| EP | 0981222 A2 | 2/2000 |
| EP | 1001570 A2 | 5/2000 |
| EP | 1047209 A1 | 10/2000 |
| EP | 1061687 A1 | 12/2000 |
| EP | 1091516 A1 | 4/2001 |
| EP | 1093241 A1 | 4/2001 |
| EP | 1148673 A2 | 10/2001 |
| EP | 1180907 A2 | 2/2002 |
| EP | 1187506 A1 | 3/2002 |
| EP | 1204217 A1 | 5/2002 |
| EP | 1255369 | 11/2002 |
| EP | 1267513 | 12/2002 |
| EP | 1074099 B1 | 2/2003 |
| EP | 1286490 A2 | 2/2003 |
| EP | 1335504 A2 | 8/2003 |
| EP | 1351538 A1 | 10/2003 |
| EP | 1376920 A1 | 1/2004 |
| EP | 1392073 A1 | 2/2004 |
| EP | 1434365 | 6/2004 |
| EP | 1441469 | 7/2004 |
| EP | 1445873 A2 | 8/2004 |
| EP | 1465449 A1 | 10/2004 |
| EP | 1478204 A2 | 11/2004 |
| EP | 1507421 A1 | 2/2005 |
| EP | 1513356 | 3/2005 |
| EP | 1531575 A2 | 5/2005 |
| EP | 1533950 A1 | 5/2005 |
| EP | 1538863 A1 | 6/2005 |
| EP | 1542488 A1 | 6/2005 |
| EP | 1601149 A2 | 11/2005 |
| EP | 1643669 A1 | 4/2006 |
| EP | 1898542 A1 | 3/2008 |
| EP | 1941693 | 7/2011 |
| FR | 2584884 | 1/1987 |
| GB | 2279540 A | 1/1995 |
| GB | 2348776 A | 10/2000 |
| GB | 2412541 A | 9/2005 |
| IL | 167573 | 2/2011 |
| IL | 201872 | 5/2012 |
| JP | H04111544 A | 4/1992 |
| JP | 4301931 | 10/1992 |
| JP | H0746248 A | 2/1995 |
| JP | 7336323 | 12/1995 |
| JP | 8116329 A | 5/1996 |
| JP | 08288927 | 11/1996 |
| JP | 9008725 A | 1/1997 |
| JP | H09501548 A | 2/1997 |
| JP | 9131342 | 5/1997 |
| JP | 9182148 A | 7/1997 |
| JP | 09214404 | 8/1997 |
| JP | 9284200 A | 10/1997 |
| JP | 10117162 | 5/1998 |
| JP | H10210000 A | 8/1998 |
| JP | 10322304 | 12/1998 |
| JP | H11168453 A | 6/1999 |
| JP | 11191756 A | 7/1999 |
| JP | 11196109 | 7/1999 |
| JP | 11508417 T | 7/1999 |
| JP | 11239155 A | 8/1999 |
| JP | 11298954 | 10/1999 |
| JP | 11331927 A | 11/1999 |
| JP | 2000102065 | 4/2000 |
| JP | 2000184425 | 6/2000 |
| JP | 2000511750 A | 9/2000 |
| JP | 2000332724 | 11/2000 |
| JP | 2001016644 A2 | 1/2001 |
| JP | 2001045573 A | 2/2001 |
| JP | 2001057545 A | 2/2001 |
| JP | 2001156732 A | 6/2001 |
| JP | 2001238269 | 8/2001 |
| JP | 2001245355 A | 9/2001 |
| JP | 2001249802 | 9/2001 |
| JP | 2001285927 A | 10/2001 |
| JP | 2001521698 A | 11/2001 |
| JP | 2001526012 | 12/2001 |
| JP | 2002026790 | 1/2002 |
| JP | 2002515203 T | 5/2002 |
| JP | 2002290148 A | 10/2002 |
| JP | 2002534925 A | 10/2002 |
| JP | 2002534941 | 10/2002 |
| JP | 200318054 | 1/2003 |
| JP | 2003032218 | 1/2003 |
| JP | 2003500909 | 1/2003 |

(56) References Cited

FOREIGN PATENT DOCUMENTS

| | | |
|---|---|---|
| JP | 200369472 | 3/2003 |
| JP | 2003101515 | 4/2003 |
| JP | 2003169367 A | 6/2003 |
| JP | 2003174426 | 6/2003 |
| JP | 2003199173 A | 7/2003 |
| JP | 2003520523 | 7/2003 |
| JP | 2003249907 A | 9/2003 |
| JP | 2003292667 A | 10/2003 |
| JP | 2003318857 A | 11/2003 |
| JP | 2003347985 | 12/2003 |
| JP | 2003348047 | 12/2003 |
| JP | 2003536308 A | 12/2003 |
| JP | 2004007643 A | 1/2004 |
| JP | 2004023716 | 1/2004 |
| JP | 2004048716 | 2/2004 |
| JP | 200472457 | 3/2004 |
| JP | 2004072157 A | 3/2004 |
| JP | 2004096142 A | 3/2004 |
| JP | 2004507950 A | 3/2004 |
| JP | 2004153676 | 5/2004 |
| JP | 2004158901 A | 6/2004 |
| JP | 2004162388 A | 6/2004 |
| JP | 2004194262 A | 7/2004 |
| JP | 2004201296 A | 7/2004 |
| JP | 2004215022 A | 7/2004 |
| JP | 2004221972 | 8/2004 |
| JP | 2004266818 | 9/2004 |
| JP | 2004529524 T | 9/2004 |
| JP | 2004297276 A | 10/2004 |
| JP | 2004297370 A | 10/2004 |
| JP | 2004297756 | 10/2004 |
| JP | 2004534456 | 11/2004 |
| JP | 2004535106 | 11/2004 |
| JP | 2005006337 | 1/2005 |
| JP | 2005020530 A | 1/2005 |
| JP | 2005502218 A | 1/2005 |
| JP | 2005502218 T | 1/2005 |
| JP | 2005506757 | 3/2005 |
| JP | 2005110130 A | 4/2005 |
| JP | 2005130491 A | 5/2005 |
| JP | 2005167502 A | 6/2005 |
| JP | 2005197772 | 7/2005 |
| JP | 2005203961 | 7/2005 |
| JP | 2005521327 | 7/2005 |
| JP | 2005521358 | 7/2005 |
| JP | 2005236678 A | 9/2005 |
| JP | 2006505172 | 2/2006 |
| JP | 2006505230 A | 2/2006 |
| JP | 2006506860 A | 2/2006 |
| JP | 2006211537 A | 8/2006 |
| JP | 2006518173 A | 8/2006 |
| JP | 2006524930 A | 11/2006 |
| JP | 2007500486 A | 1/2007 |
| JP | 2007503790 | 2/2007 |
| JP | 2007519281 | 7/2007 |
| JP | 2007520309 A | 7/2007 |
| JP | 2007525043 A | 8/2007 |
| JP | 2007527127 | 9/2007 |
| JP | 2008505587 A | 2/2008 |
| JP | 2008535398 | 8/2008 |
| JP | 4188372 B2 | 11/2008 |
| JP | 2008546314 | 12/2008 |
| JP | 04694628 | 6/2011 |
| KR | 0150275 B1 | 11/1998 |
| KR | 20000060428 | 10/2000 |
| KR | 100291476 B1 | 3/2001 |
| KR | 20010056333 | 4/2001 |
| KR | 20010087715 A | 9/2001 |
| KR | 20030007965 | 1/2003 |
| KR | 20030035969 A | 5/2003 |
| KR | 20040063057 | 7/2004 |
| KR | 200471652 | 8/2004 |
| KR | 20040103441 A | 12/2004 |
| KR | 20050061559 | 6/2005 |
| KR | 20050063826 A | 6/2005 |
| KR | 100606099 | 7/2006 |
| RU | 95121152 | 12/1997 |
| RU | 2141168 C1 | 11/1999 |
| RU | 2141706 C1 | 11/1999 |
| RU | 2159007 C2 | 11/2000 |
| RU | 2162275 C2 | 1/2001 |
| RU | 2183387 C2 | 6/2002 |
| RU | 2192094 C1 | 10/2002 |
| RU | 2197778 C2 | 1/2003 |
| RU | 2201033 C2 | 3/2003 |
| RU | 2207723 C1 | 6/2003 |
| RU | 2208913 | 7/2003 |
| RU | 2210866 C2 | 8/2003 |
| RU | 2216101 C2 | 11/2003 |
| RU | 2216103 C2 | 11/2003 |
| RU | 2216105 | 11/2003 |
| RU | 2225080 C2 | 2/2004 |
| RU | 2235429 | 8/2004 |
| RU | 2235432 | 8/2004 |
| RU | 2237379 C2 | 9/2004 |
| RU | 2238611 C1 | 10/2004 |
| RU | 2242091 C2 | 12/2004 |
| RU | 2003125268 | 2/2005 |
| RU | 2250564 | 4/2005 |
| RU | 2257008 | 7/2005 |
| RU | 2267224 | 12/2005 |
| RU | 2005129079 | 2/2006 |
| RU | 2285338 C2 | 10/2006 |
| RU | 2285351 C2 | 10/2006 |
| RU | 2292655 | 1/2007 |
| RU | 2335864 C2 | 10/2008 |
| RU | 2349043 C2 | 3/2009 |
| SU | 1320883 | 6/1987 |
| TW | 508960 B | 11/2002 |
| TW | 510132 | 11/2002 |
| TW | 200302642 | 8/2003 |
| TW | 200401572 | 1/2004 |
| TW | I232040 | 5/2005 |
| TW | 248266 | 1/2006 |
| TW | 200718128 | 5/2007 |
| WO | WO9408432 A1 | 4/1994 |
| WO | WO-9521494 A1 | 8/1995 |
| WO | WO9613920 A1 | 5/1996 |
| WO | WO9701256 | 1/1997 |
| WO | WO9737456 A2 | 10/1997 |
| WO | WO-9746033 A2 | 12/1997 |
| WO | WO9800946 | 1/1998 |
| WO | WO-9814026 A1 | 4/1998 |
| WO | WO9837706 A2 | 8/1998 |
| WO | WO9848581 A1 | 10/1998 |
| WO | WO9853561 | 11/1998 |
| WO | WO9854919 A2 | 12/1998 |
| WO | WO-9944313 A1 | 9/1999 |
| WO | WO-9944383 A1 | 9/1999 |
| WO | 9952250 | 10/1999 |
| WO | WO9953713 | 10/1999 |
| WO | 9960729 | 11/1999 |
| WO | WO-9959265 A1 | 11/1999 |
| WO | 0004728 | 1/2000 |
| WO | WO0002397 | 1/2000 |
| WO | WO0033503 | 6/2000 |
| WO | 0041542 | 7/2000 |
| WO | WO0070897 | 11/2000 |
| WO | WO01001596 | 1/2001 |
| WO | WO0117125 A1 | 3/2001 |
| WO | WO0126269 | 4/2001 |
| WO | WO-0139523 A2 | 5/2001 |
| WO | WO0145300 | 6/2001 |
| WO | WO-0148969 A2 | 7/2001 |
| WO | WO-0158054 A1 | 8/2001 |
| WO | WO-0160106 A1 | 8/2001 |
| WO | 0165637 A2 | 9/2001 |
| WO | WO0169814 A1 | 9/2001 |
| WO | WO0182543 A2 | 11/2001 |
| WO | WO-0182544 A2 | 11/2001 |
| WO | WO-0189112 A1 | 11/2001 |
| WO | WO0193505 | 12/2001 |
| WO | 0204936 | 1/2002 |
| WO | WO0207375 | 1/2002 |

(56) References Cited

FOREIGN PATENT DOCUMENTS

| | | |
|---|---|---|
| WO | WO0215616 | 2/2002 |
| WO | WO0219746 A1 | 3/2002 |
| WO | 0233848 | 4/2002 |
| WO | WO0231991 A2 | 4/2002 |
| WO | 0245293 A2 | 6/2002 |
| WO | WO0245456 A1 | 6/2002 |
| WO | WO0249305 | 6/2002 |
| WO | WO0249306 | 6/2002 |
| WO | WO0249306 A2 | 6/2002 |
| WO | WO0249385 A2 | 6/2002 |
| WO | WO02049305 A2 | 6/2002 |
| WO | WO02060138 A2 | 8/2002 |
| WO | WO02065675 | 8/2002 |
| WO | WO02082689 A2 | 10/2002 |
| WO | WO02082743 A2 | 10/2002 |
| WO | WO02089434 A1 | 11/2002 |
| WO | WO02093782 A1 | 11/2002 |
| WO | WO02093819 | 11/2002 |
| WO | 02099995 A2 | 12/2002 |
| WO | WO02100027 A1 | 12/2002 |
| WO | WO03001696 A2 | 1/2003 |
| WO | WO03001761 A1 | 1/2003 |
| WO | WO03003617 | 1/2003 |
| WO | WO03019819 | 3/2003 |
| WO | WO03030414 A1 | 4/2003 |
| WO | WO03034644 A1 | 4/2003 |
| WO | WO03043262 A1 | 5/2003 |
| WO | WO03043369 | 5/2003 |
| WO | 03049409 A2 | 6/2003 |
| WO | 03058871 | 7/2003 |
| WO | 03069816 A2 | 8/2003 |
| WO | WO03067783 | 8/2003 |
| WO | WO03069832 A1 | 8/2003 |
| WO | WO03073646 | 9/2003 |
| WO | WO03075479 A1 | 9/2003 |
| WO | WO03085876 | 10/2003 |
| WO | WO03088538 A1 | 10/2003 |
| WO | WO03094384 | 11/2003 |
| WO | WO03103331 | 12/2003 |
| WO | WO2004002047 A1 | 12/2003 |
| WO | WO2004004370 | 1/2004 |
| WO | WO2004008671 | 1/2004 |
| WO | WO2004008681 A1 | 1/2004 |
| WO | WO2004015912 | 2/2004 |
| WO | WO2004016007 | 2/2004 |
| WO | WO2004021605 A1 | 3/2004 |
| WO | WO2004023834 A1 | 3/2004 |
| WO | 2004028037 A1 | 4/2004 |
| WO | 2004032443 | 4/2004 |
| WO | WO2004030238 A1 | 4/2004 |
| WO | 2004038984 A2 | 5/2004 |
| WO | 2004040825 | 5/2004 |
| WO | WO2004038954 | 5/2004 |
| WO | WO2004038972 A1 | 5/2004 |
| WO | WO2004038988 | 5/2004 |
| WO | WO2004040690 A2 | 5/2004 |
| WO | WO2004040827 | 5/2004 |
| WO | WO2004047354 A1 | 6/2004 |
| WO | WO2004049618 A1 | 6/2004 |
| WO | WO2004051872 A2 | 6/2004 |
| WO | 2004056022 A2 | 7/2004 |
| WO | WO2004062255 | 7/2004 |
| WO | WO2004064294 | 7/2004 |
| WO | WO2004064295 | 7/2004 |
| WO | WO2004066520 | 8/2004 |
| WO | WO2004068721 A2 | 8/2004 |
| WO | WO2004073276 | 8/2004 |
| WO | WO2004075023 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004077850 A2 | 9/2004 |
| WO | WO2004084509 | 9/2004 |
| WO | WO2004086706 A1 | 10/2004 |
| WO | WO2004086711 | 10/2004 |
| WO | WO2004095730 A1 | 11/2004 |
| WO | WO2004095851 | 11/2004 |
| WO | WO2004095854 | 11/2004 |
| WO | WO2004098072 A2 | 11/2004 |
| WO | WO2004098222 | 11/2004 |
| WO | WO2004102815 | 11/2004 |
| WO | WO2004102816 A2 | 11/2004 |
| WO | 2004114564 A1 | 12/2004 |
| WO | 2004114615 A1 | 12/2004 |
| WO | WO2004105272 A1 | 12/2004 |
| WO | WO2004114549 | 12/2004 |
| WO | 2005002253 | 1/2005 |
| WO | 2005011163 A1 | 2/2005 |
| WO | 2005018270 | 2/2005 |
| WO | WO2005015795 A1 | 2/2005 |
| WO | WO2005015797 | 2/2005 |
| WO | WO2005015810 | 2/2005 |
| WO | WO2005015941 | 2/2005 |
| WO | WO2005020488 A1 | 3/2005 |
| WO | WO2005020490 | 3/2005 |
| WO | WO2005022811 | 3/2005 |
| WO | WO2005025110 A2 | 3/2005 |
| WO | WO2005032004 A1 | 4/2005 |
| WO | 2005043780 A1 | 5/2005 |
| WO | WO2005043855 | 5/2005 |
| WO | WO2005046080 A1 | 5/2005 |
| WO | 2005055465 A1 | 6/2005 |
| WO | WO2005055484 A1 | 6/2005 |
| WO | WO2005055527 | 6/2005 |
| WO | WO2005060192 A1 | 6/2005 |
| WO | WO2005065062 A2 | 7/2005 |
| WO | WO2005069538 A1 | 7/2005 |
| WO | WO2005074184 | 8/2005 |
| WO | 2005086440 A1 | 9/2005 |
| WO | WO2005096538 | 10/2005 |
| WO | WO2005122628 | 12/2005 |
| WO | 2006007292 A2 | 1/2006 |
| WO | WO2006019710 | 2/2006 |
| WO | WO-2006026344 A1 | 3/2006 |
| WO | WO2006044487 | 4/2006 |
| WO | 2006062356 A1 | 6/2006 |
| WO | 2006069301 | 6/2006 |
| WO | WO2006069300 | 6/2006 |
| WO | WO2006069397 | 6/2006 |
| WO | WO2006077696 | 7/2006 |
| WO | WO-2006096784 A1 | 9/2006 |
| WO | WO-2006099349 A1 | 9/2006 |
| WO | WO2006099545 A1 | 9/2006 |
| WO | WO2006099577 A1 | 9/2006 |
| WO | WO2006127544 A2 | 11/2006 |
| WO | WO-2006134032 A1 | 12/2006 |
| WO | WO-2006138196 A1 | 12/2006 |
| WO | WO-2006138573 A2 | 12/2006 |
| WO | WO2006138581 A2 | 12/2006 |
| WO | 2007022430 A2 | 2/2007 |
| WO | WO-2007024934 A2 | 3/2007 |
| WO | WO2007024935 | 3/2007 |
| WO | WO2007025160 | 3/2007 |
| WO | WO-2007051159 A2 | 5/2007 |

OTHER PUBLICATIONS

Keller, et al., "Adaptive Multicarrier Modulation: A Convenient Framework for Time-Frequency Processing in Wireless Communications," Proceedings of the IEEE, vol. 88, No. 5, May 2000, pp. 611-640.

Schnell, et al., "A Promising New Wideband Multiple-Access Scheme for Future Mobile Communications Systems," European Transactions on Telecommunications, Wiley & Sons, Chichester, GB, vol. 10, No. 4, Jul. 1999, pp. 417-427.

Tellado, "Multicarrier Modulation with Low Par," Kluwer Academic, Dordrecht, NL, XP-002199500, 2000, pp. 6-11 and 55-60.

Wang, et al., "Improving performance of multi-user OFDM systems using bit-wise interleaver" Electronics Letters, IEE Stevenage, GB, vol. 37, No. 19, Sep. 13, 2001, pp. 1173-1174, XP006017222.

Yun, et al., "Performance of an LDPC-Coded Frequency-Hopping OFDMA System Based on Resource Allocation in the Uplink"

(56) References Cited

OTHER PUBLICATIONS

Vehicular Technology Conference, 2004. VTC 2004-Spring. 2004 IEEE 59th Milan, Italy, May 17-19, 2004, Piscataway, NJ, USA, vol. 4, May 17, 2004, pp. 1925-1928, XP010766497.
3GPP TS 33.220 V.1.1.0 XX,XX, "3rd Generation Partnership Project; Technical Specification Group Services and System Aspects; Generic Authentication Architecture (GAA); Generic Bootstrapping Architecture (Release 6)" Feb. 9, 2004, pp. 1-17, figure 4, XP002996023.
3rd Generation Partnership Project; Technical Specification Group Radio Access Network; Physical Layer Aspects for Evolved UTRA (Release 7), 3GPP TR 25.814 v0.3.1 (Nov. 2005).
Bahai, Saltzberg: "System Architecture," Multi-Carrier Digital Communications, Kluwer Academic, New York, NY, XP-002199501, 1999, pp. 17-21.
Bingham: "Other Types of MCM," ADSL, VDSL, and Multicarrier Modulation, John Wiley & Sons, New York, XP-002199502. 2000, pp. 111-113.
Blum et al, "On Optimum MIMO with antenna selection," IEEE International Conference on Communications: Conference Proceedings, vol. 1, Apr. 28, 2002, pp. 386-390.
Catreux, S. et al.: "Simulation results for an interference-limited multiple input multiple output cellular system"., Global Telecommunications Conference, 2000. GLOBECOM '00. IEEE. Dec. 1, 2000. vol. 2, pp. 1094-1096 http://ieeexplore.ieee.org/iel5/7153/19260/00891306.pdf?tp=&isnumber=19260&arnumber=8913063&punumber=7153.
Chennakeshu, et al. "Capacity Analysis of a TDMA-Based Slow-Frequency—Hopped Cellular System," IEEE Transaction on Vehicular Technology, vol. 45., No. 3 Aug. 1996, pp. 531-542.
Chiani, et al. "Outage Evaluation for Slow Frequency-Hopping Mobile Radio Systems" IEEE Transactions on Communications, vol. 47, No. 12, Dec. 1999, pp. 1865-1874.
Choi, et al., "Design of the Optimum Pilot Pattern for Channel Estimation in OFDM Systems," Global Telecommunications Conference, IEEE Communications Society, Globecom, Dallas, Texas (2004), p. 3661-3665.
Chung, S. et al.: "Low complexity algorithm for rate and power quantization in extended V-Blast" VTC Fall 2001. IEEE 54th. Vehicular Technology Conference Proceedings. Atlantic City, NJ, Oct. 7-11, 2001, vol. 1 of 4, pp. 910-914, Conf. 54.
Czylwik: "Comparison Between Adaptive OFDM and Single Carrier Modulation with Frequency Domain Equalization," IEEE 47th Vehicular Technology Conference, vol. 2, May 4-7, 1997, pp. 865-869.
Das et al., "On the Reverse Link Interference Structure for Next Generation Cellular Systems," Global Telecommunications Conference, 2004. GLOBECOM '04, IEEE, vol. 5 IEEE Nov. 29-Dec. 3, 2004, pp. 3068-3072.
Dierks, et al., "The TLS Protocol", Version 1.0, Network Working Group, Request for Comments 2246, pp. 1-80 (Jan. 1999).
Dinis R; Falconer D; Tong Lam C; Sabbaghian M: "A Multiple Access Scheme for the Uplink of Broadband Wireless Systems" Global.
Don Torrieri, "Cellular Frequency-Hopping CDMA Systems," IEEE Vehicular Technology Conference, May 16, 1999, pp. 919-925, vol. 2.
El Gamal, et al.: "Universal Space-Time Coding," IEEE Transactions on Information Theory, vol. 49, Issue 5, pp. 1097-1119, XP011074756, ISSN: 0018-9448, May 2003.
Hermann Rohling et al., : "Performance Comparison of Different Multiple Access Schemes for the Downlink of an OFDM Communication System", Vehicular Technology Conference, 1997, 47th IEEE, vol. 3, May 3-7, 1997, pp. 1365-1369.
Hill, et al., "Cyclic Shifting and Time Inversion of Partial Transmit Sequences to Reduce the Peak-to-Average Power Ratio in OFDM," IEEE International Symposium on Personal, Indoor and Mobile Radio Communications, vol. 2, Sep. 18, 2000, Piscataway, NJ, pp. 1256-1259.
Hochwald et al., "Achieving near-capacity on a multiple-antenna channel," IEEE Transactions on Communications, IEEE Service Center, Piscataway, New Jersey, vol. 51, No. 3, pp. 389-399 (2003).
Hui Won Je et al, "A Novel Multiple Access Scheme for Uplink Cellular Systems," Vehicular Technology Conference, 2004, VTC2004-fall, 2004 IEEE 60th Los Angeles, CA, US, Sep. 26-29, 2004, Piscataway, NY, pp. 984-988.
International Search Report and Written Opinion—PCT/US06/031147, International Search Authority—European Patent Office, Feb. 2, 2007.
J.S. Chow and J.M. Cioffi: "A cost-effective maximum likelihood reciever for multicarrier systems", Proc. IEEE Int. Conf. on Comm., pp. 948-952, Jun. 1992.
Kaleh: "Channel Equalization for Block Transmission Systems," IEEE Journal on Selected Areas in Communications, vol. 13, No. 1, Jan. 1995, pp. 110-121.
Kappes, J.M., and Sayegh, S.I., "Programmable Demultiplexer/Demodulator Processor," COMSAT Laboratories, IEEE, 1990, pp. 230-234.
Karsten Bruninghaus et al., : "Multi-Carrier Spread Spectrum and It's relationship to Single-Carrier Transmission", Vehicular technology Conference, 1998, VTC 98, 48th IEEE, vol. 3, May 18-21, 1998, pp. 2329-2332.
Kiessling et al, "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kim, et al. "Performance of TDMA System With SFH and 2-bit Differentially Detected GMSK Over Rayleigh Fading Channel," IEEE Vehicular Technology Conference, Apr. 28, 1996, pp. 789-793.
Kishiyama et al., Investigation of optimum pilot channel structure for VSF-OFCDM broadband wireless access in forward link, VTC 2003-Spring, The 57th IEEE Semiannual Vehicular Technology Conference, Proceedings JEJU, Korea, Apr. 22-25, 2003, pp. 139-144.
Kostic, et al. "Dynamic Frequency Hopping in Wireless Cellular Systems-Simulations of Full-Replacement and Reduced-Overhead Methods," IEEE Vehicular Technology Conference, May 16, 1999, pp. 914-918.
Kostic, et al. "Fundamentals of Dynamic Frequency Hopping in Cellular Systems," IEEE Journal on Selected Areas in Communications, vol. 19, No. 11, Nov. 2001, pp. 2254-2266.
Kousa, M. et al: "Adaptive Binary Coding for Diversity Communication Systems" IEEE International Conference on Personal Wireless Communications Proceedings, pp. 80-84, XP000992269, 1997.
Lacroix, et al.: "A Study of OFDM Parameters for High Data Rate Radio LAN's," 2000 IEEE 51st Vehicular Technology Conference Proceedings, vol. 2, May 15-18, 2000, pp. 1075-1079.
Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.
Lott: "Comparison of Frequency and Time Domain Differential Modulation in an OFDM System for Wireless ATM," 1999 IEEE 49th Vehicular Technology Conference, vol. 2, Jul. 1999, pp. 877-883.
Mignone, et al.: "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.
Naofal Al-Dhahir: "A Bandwidth-Optimized Reduced-Complexity Equalized Multicarrier Transceiver", IEEE Transactions on Communications, vol. 45, No. 8, Aug. 1997.
Naofal Al-Dhahir: "Optimum Finite-Length Equalization for Multicarrier Transceivers", IEEE Trans. On Comm., pp. 56-64, Jan. 1996.
Nassar et al., "Introduction of Carrier Interference to Spread Spectrum Multiple Access," Wireless Communications and Systems, 1999 Emerging Technologies Symposium, IEEE, Apr. 12-13, 1999, pp. 1-5.
Natarajan, et al., "High-Performance MC-CDMA via Carrier Interferometry Codes," IEEE Transactions on Vehicular Technology, 2001, vol. 50 (issue 6).
Nokia, "Uplink Considerations for UTRA LTE", 3GPP TSG RAN WG1#40bis, Beijing, CN, R1-050251, 3GPP, Apr. 4, 2005, pp. 1-9.

(56) References Cited

OTHER PUBLICATIONS

NTT DoCoMo, "Downlink Multiple Access Scheme for Evolved UTRA", 3GPP R1-050249, 3GPP, Apr. 4, 2005, pp. 1-8.
Prasad, N. et al.: "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.
Qualcomm Europe: "Description and link simulations for OFDMA based E-UTRA uplink" 3GPP Draft; R1-051100, 3rd Generation Partnership Project (3GPP), Mobile Competence Centre ; 650, Route Des Lucioles ; F-06921 Sophia-Antipolis Cedex ; France, vol. RAN WG1, no. San Diego, USA; 20051004, Oct. 4, 2005, pp. 1-10, XP050100715.
S. Nishimura et al., "Downlink Nullforming by a Receiving Antenna Selection for a MIMO/SDMA Channel", Technical Search Report of Electric Information Communication Academic Conference, Feb. 28, 2002, vol. 101, No. 683, pp. 17-22, RCS 2001-286.
Sandeep Chennakeshu et al., "A comparison of diversity schemes for a mixed-mode slow frequency-hopped cellular system," Global Telecommunications Conference, 1993, including a Communications Theory Mini-Conference. Technical Program Conference Record, IEEE in Houston. GLOBECOM '93., IEEE, Nov. 29, 1993, pp. 1749-1753, vol. 3.
Sari, et al., "Transmission Techniques for Digital Terrestrial TV Broadcasting," IEEE Communications Magazine, Feb. 1995, pp. 100-109.
Schnell et al., "Application of IFDMA to Mobile Radio Transmission", IEEE 1998 International Conference on Universal Personal Communications, vol. 2, Oct. 5-9, 1998, pp. 1267-1272.
Schnell et al.,: "A Promising New Wideband Multiple-Access Scheme for Future Mobile Communications Systems" European Transactions on Telecommunications, vol. 10, No. 4, Jul. 1999, pp. 417-427.
Shattil et al., "Array Control Systems for Multicarrier Protocols Using a Frequency-Shifted Feedback Cavity", Radio and Wireless Conference EEE, Aug. 1-4, 1999, pp. 215-218.
Sorger U., et al., "Interleaved FDMA—A New Spread-Spectrum Multiple-Access Scheme, XP010284733," Communications, Conference Record, IEEE, Atlanta, GA, 1998, 1013-1017.
Tellambura, "Use of m-sequences for OFDM Peak-to-Average Power Ratio Reduction," Electronics Letters, vol. 33, No. 15, Jul. 17, 1997, pp. 1300-1301.
Widdup, B. et al., "A highly-parallel VLSI architecture for a list sphere detector," IEEE International Conference, Paris, France, vol. 5, pp. 2720-2725 (2004).
Wiesel, A. et al.: "Efficient implementation of sphere demodulation" Signal Processing Advances in Wireless Communications, 2003. SPAWC 200 3. 4th IEEE Workshop on Rome. Italy Jun. 15-18, 2003, Piscataway, NJ, USA, IEEE, US, Jun. 15, 2003, pp. 36-40, XP010713463.
Xiaodong, et al., "M-Sequences for OFDM Peak-to-Average Power Ratio Reduction and Error Correction," Electronics Letters, vol. 33, Issue 7, Mar. 27, 1997, pp. 554-555.
Zekri, et al., "DMT Signals with Low Peak-to-Average Power Ratio," Proceedings, IEEE International Symposium on Computers and Communications, 1999, Jul. 6-8, 1999, pp. 362-368.
B. Sklar: "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 104-106.
Dinis R; Falconer D; Tong Lam C; Sabbaghian M: "A Multiple Access Scheme for the Uplink of Broadband Wireless Systems" Global Telecommunications Conference, 2004. GLOBECOM '04. IEEE Dallas, TX, USA Nov. 29-Dec. 3, 2004, vol. 6, pp. 3808-3812, XP010758449 Piscataway , NJ, USA, IEEE.
Taiwan Search Report—TW095129021—TIPO—May 24, 2011.
Das, Arnab, et al. "Adaptive, asynchronous incremental redundancy (A-IR) with fixed transmission time intervals TTI for HSDPA." IEEE, pp. 10-83-1087, year 2002.
Digital cellular telecommunications system (Phase 2+); Mobile radio interface layer 3 specification (GSM 04.08 version 7.7.1 Release 1998); ETSI EN 300 940 V7.7.1 (Oct. 2000), pp. 1,2,91-93.
Favre et al: "Self-Adaptive Transmission Procedure" IBM Technical Disclosure Bulletin, IBM Corporation, Sep. 1976, vol. 19, No. 4, pp. 1283-1284, New York, New York.
Fuchs, et al., "A Novel Tree-Based Scheduling Algorithm for the Downlink of Multi-User MIMO Systems with ZF Beamforming," IEEE International Conference on Acoustics, Speech, and Signal Processing, 2005, Proceedings, Philadelphia, PA, pp. 1121-1124.
Groe, et al., "CDMA Mobile Radio Design," Sep. 26, 2001, Artech House, Norwood, MA 02062, pp. 257-259.
John B. Groe, Lawrence E. Larson, "CDMA Mobile Radio Design" Sep. 26, 2001, Artech House, Norwood, MA02062 580530, XP002397967, pp. 157-159.
Laroia, R. et al: "An integrated approach based on cross-layer optimization—Designing a mobile broadband wireless access network" IEEE Signal Processing Magazine, IEEE Service Center, Piscataway, NJ, US, vol. 21, No. 5, Sep. 2004, pp. 20-28, XP011118149.
Lau, et al., "On the Design of MIMO Block-Fading Channels with Feedback-Link Capacity Constraint," IEEE Transactions on Communications, IEEE Service Center, Piscataway, NJ, US, v. 52, No. 1, Jan. 2004, pp. 62-70, XP001189908.
Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA, New York, New York.
Molisch, et al., MIMO systems with antenna selection, IEEE Microwave Magazine, URL: http://ieeexplore.ieee.org/iel5/6668/28677/01284943.pdf, Retrieved on Dec. 8, 2006, pp. 46-56 (2004).
NTT DoCoMo, et al.: "Orthogonal Common Pilot Channel and Scrambling Code in Evolved UTRA Downlink," 3GPP TSG RAN WG1 #42 on LTE, pp. 1-8 (Aug.-Sep. 2005).
TIA/EIA/IS-2000 "Standards for CDMA2000 Spread Spectrum Systems" Version 1.0 Jul. 1999.
TIA/EIA/IS-95 "Mobile Station-Base Station Compatibility Standard for Dual-Mode Wideband Spread Spectrum Cellular System" Jul. 1993.
TIA-1121.001 "Physical Layer for Ultra Mobile Broadband (UMB) Air Interface Specification," 3GPP2 C.S0084-001-0, Version 2.0 (Aug. 2007).
TIA-1121.002 "Medium Access Control Layer for Ultra Mobile Broadband (UMB) Air Interface Specification," 3GPP2 C.S0084-002-0, Version 2.0 (Aug. 2007).
Tomcik, J.: "MBFDD and MBTDD Wideband Mode: Technology Overview," IEEE 802.20 Working Group Mobile Broadband Wireless Access, Jan. 2006, pp. 1-109, XP002429968.
Tomcik, J.: "QFDD Technology Overview Presentation," IEEE 802.20 Working Group on Mobile Broadband Wireless Access, Slides/pp. 1-73, Nov. 15, 2005 and Oct. 28, 2005.
Toufik I et al., "Channel allocation algorithms for multi-carrier systems", Vehicular Technology Conference, 2004. VTC2004-Fall. 2004 IEEE 60th Los Angeles, CA, USA Sep. 26-29, 2004, pp. 1129-1133, XP010786798, ISBN: 07-7803-8521-7.
"European Search Report—EP10011743, Search Authority—Munich Patent Office, Dec. 20, 2010".
European Search Report—EP10012081, Search Authority—Munich Patent Office, Dec. 17, 2010.
European Search Report—EP10012082, Search Authority—Munich Patent Office, Dec. 20, 2010.
European Search Report—EP10012083, Search Authority—Munich Patent Office, Dec. 30, 2010.
Guo, K. et al.: "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
Sumii, Kenji et al.: "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.
Taiwanese Search Report—095139893—TIPO—Dec. 30, 2010.

(56) References Cited

OTHER PUBLICATIONS

Tomcik, T.: "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).
Translation of Office Action in Chinese Application 2006800295980 corresponding to U.S. Appl. No. 11/260,895, citing CN1346221 and CN1383631 dated Feb. 16, 2011.
Translation of Office Action in Japan application 2008-538193 corresponding to U.S. Appl. No. 11/261,065, citing JP11196109, JP10322304 and JP09008725 dated Mar. 8, 2011.
Translation of Office Action in Korean application 10-2007-7031029 corresponding to U.S. Appl. No. 11/260,931, citing US20030202491 and KR20040063057 dated Jan. 28, 2011.
Translation of Office Action in Canadian application 2625987 corresponding to U.S. Appl. No. 11/261,065, citing CA2557369 dated Apr. 12, 2011.
Translation of Office Action in Chinese application 200680040236.1 corresponding to U.S. Appl. No. 11/261,065, citing US20040048609 and CN1402916 dated Feb. 18, 2011.
Translation of Office Action in Chinese application 200680048265.2 corresponding to U.S. Appl. No. 11/260,931, citing US6904097, WO2004095851, CN1344451 dated Jan. 26, 2011.
Translation of Office Action in Chinese application 200680048832.4 corresponding to U.S. Appl. No. 11/261,158, citing CN1132474 dated Dec. 31, 2010.
Translation of Office Action in Japanese Application 2008-514880 corresponding to U.S. Appl. No. 11/445,377, citing JP2007519281 and JP2006505172 dated Nov. 9, 2010.
Translation of Office Action in Japanese application 2008-528103 corresponding to U.S. Appl. No. 11/260,924, citing JP2005502218, JP2004534456, JP2003348047, JP2003199173, JP2004529524, JP11508417, JP2001238269, JP2005130491 and JP2003500909 dated Feb. 8, 2011.
Translation of Office Action in Japanese Application 2008-529216 corresponding to U.S. Appl. No. 11/261,159, citing GB2348776 , WO2004098222, WO2005065062 and WO2004102815.Dated Jan. 11, 2011.
Translation of Office Action in Japanese application 2008-538181 corresponding to U.S. Appl. No. 11/511,735, citing WO04064295, JP2002515203, JP8288927, JP7336323 and JP200157545 dated Jan. 25, 2011.
Yongmei Dai,; Sumei Sun; Zhongding Lei; Yuan Li.: "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS. 2004.1388940.
Alcatel-Lucent, et al., "Dedicated Reference Signals for Precoding in E-UTRA Downlink" 3GPP Draft; R1-071718, 3rd Generation Partnership Project (3GPP), Mobile Competence Centre; 650, Route Des Lucioles; F-06921 Sophia-Antipolis Cedex; France, vol. RAN WG1, No. St. Julian; Apr. 3, 2007, XP050105640 [retrieved on Apr. 3, 2007].
Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
Dai, Y. et al., "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS.2004.1388940.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
Guo, K. Et al., "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
Ken Murakami et al., "Status Toward Standardization at IEEE 802. 3ah and items on the construction of GE-PON system ," Technical Report of the Institute of Electronics, Information and Communication Engineers, Jun. 13, 2003, vol. 103, No. 124, pp. 1-6, IN2003-24.
Maniatis, I. et al., "Pilots for joint channel estimation in multi-user OFDM mobile radio systems," 2002 IEEE Seventh International Symposium on Spread Spectrum Techniques and Applications, Prague, Czech Republic, Sep. 2, 2002, pp. 44-48, XP010615562.
Physical Channels and Multiplexing in Evolved UTRA Downlink TSG-RAN Working Group 1 Meeting, XX, XX, vol. RI-050590, Jun. 20, 2005, pp. 1-24, XP003006923 the whole document.
Siemens, "Evolved UTRA uplink scheduling and frequency reuse" [online], 3GPP TSG-RAN WG1 # 41 R1-050476, Internet <URL:http://www.3gpp.org/ftp/tsg_ran/WG1_RL1/TSGR1_41/Docs/R1-050476.zip>, May 9, 2005.
Sumii, Kenji, et al., "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.
Tomcik, Jim: "QFDD Technology Overview Presentation," IEEE 802.20 Working Group on Mobile Broadband Wireless Access, [Online] Nov. 15, 2005, pp. 1-73, XP002467626.
Viswanath, P. et al, "Opportunistic Beamforming Using Dumb Antennas" IEEE Transactions on Information Theory, IEEE USA, vol. 48, No. 6, Jun. 2002, pp. 1277-1294, XP002314708 ISSN: 0018-9448 abstract right-hand column, paragraph 1.
Voltz, P. J.,"Characterization of the optimum transmitter correlation matrix for MIMO with antenna subset selection", IEEE Transactions on Communications, vol. 51, No. 11, pp. 1779-1782, (Nov. 1, 2003).
Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, pp. 317-320, Mar. 18, 2005.
Miorandi D., et al., "Analysis of master-slave protocols for real-time industrial communications over IEEE 802.11 WLANs" Industrial Informatics, 2004. Indin '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.
Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nfo/36211.htm> [retrieved on Sep. 27, 2007] Section 5.
Jim Tomcik, QFDD and QTDD: Technology Overview, IEEE 802.20 Working Group on Mobile Broadband Wireless Access, Oct. 28, 2005, pp. 48-50, URL, http://www.IEEE802.org/20/contribs/C802.20-05-68.zip.
NOKIA: "Compact signalling of multi-code allocation for HSDPA", version 2, 3GPP R1-02-0018, Jan. 11, 2002.
Sethi M, et al., "Code Reuse DS-CDMA- A Space Time Approach", Proceedings of the 2002 IEEE International Conference on Acoustics, Speech, and Signal Processing (ICASSP), pp. 2297-2300, May 13-17, 2002.
Samsung: "Uplink Transmission and Multiplexing for EUTRA", 3GPP Draft; R1-050605 UL Multiplexing, Jun. 16, 2005, XP050111420.
Bhushan N., "UHDR Overview", C30-20060522-037, Denver, CO, May 22, 2006, pp. 1-115.
Tachikawa (Editor); "W-CDMA Mobile Communication Systems," John Wiley & Sons Ltd., Japan, Maruzen: pp. 82-213, Jun. 25, 2001.
LG Electronics: "PAPR comparison of uplink MA schemes", 3GPP TSG RAN WG1 Meeting #41, R1-050475, May, 9-13, 2005, pp. 6.
Motorola,"Uplink Numerology and Frame Structure", 3GPP TAG RAN1 #41 Meeting R1-050397, May 13, 2005.
Samsung Electonics Co. Ltd.; "Uplink Multiple Access and Multiplexing for Evolved UTRA", R1-050439, May 3, 2005, pp. 1-22, XP55018616, Retrieved from the Internet: URL:http://www.3gpp.org/ftp/tsg_ran/VVG1_R1/TSGR1/DOCS/ [retrieved on Feb. 7, 2012].
Tomcik J., "QFDD and QTDD: Proposed Draft Air Interface Specification," IEEE C802.20-05/69, IEEE 802.20 Working Group on Mobile Broadband Wireless Access, Oct. 28, 2005, P.1-6,1-7,1-16,6-65,7-11,7-33,7-37-7-55,9-21,9-22,9-24-9-32.

(56) References Cited

OTHER PUBLICATIONS

Digital cellular telecommunications system (Phase 2+); General Packet Radio Service (GPRS); Mobile Station (MS)-Base Station System (BSS)interface; Radio Link Control/Medium Access Control (RLC/MAC) protocol (GSM 04.60 version 8.4.1 Release 1999), 3GPP Standard; ETSI EN 301 349, 3rd Generation Partnership Project (3GPP), Mobile Competence Centre; 650, Route Des Lucioles; F-06921 Sophia-Antipolis Cedex; France, No. V8.4.1, Oct. 1, 2000, pp. 1-243, XP050358534.

* cited by examiner

CODE DIVISION MULTIPLEXING IN A SINGLE-CARRIER FREQUENCY DIVISION MULTIPLE ACCESS SYSTEM

CLAIM OF PRIORITY UNDER 35 U.S.C. §119

The present Application for Patent claims priority to Provisional Application No. 60/706,639 entitled "CODE DIVISION MULTIPLEXING IN A SINGLE-CARRIER FREQUENCY DIVISION MULTIPLE ACCESS SYSTEM" filed Aug. 8, 2005, and Ser. No. 60/710,503 entitled "CODE DIVISION MULTIPLEXING IN A SINGLE-CARRIER FREQUENCY DIVISION MULTIPLE ACCESS SYSTEM" filed Aug. 22, 2005, and Ser. No. 60/710,428 entitled "CODE DIVISION MULTIPLEXING IN A SINGLE-CARRIER FREQUENCY DIVISION MULTIPLE ACCESS SYSTEM" filed Aug. 22, 2005, all assigned to the assignee hereof and hereby expressly incorporated by reference herein.

BACKGROUND

I. Field

The present disclosure relates generally to communication, and more specifically to transmission techniques in a wireless communication system.

II. Background

A multiple-access system can concurrently communicate with multiple terminals on the forward and reverse links. The forward link (or downlink) refers to the communication link from the base stations to the terminals, and the reverse link (or uplink) refers to the communication link from the terminals to the base stations. Multiple terminals may simultaneously transmit data on the reverse link and/or receive data on the forward link. This is often achieved by multiplexing the multiple data transmissions on each link to be orthogonal to one another in time, frequency and/or code domain. For example, data transmissions for different terminals may be orthogonalized by using different orthogonal codes in a code division multiple access (CDMA) system, by transmitting in different time slots in a time division multiple access (TDMA) system, and by transmitting on different frequency subbands in a frequency division multiple access (FDMA) system or an orthogonal frequency division multiple access (OFDMA) system.

The terminals may transmit various types of data such as, e.g., traffic data, signaling, and pilot. Traffic data refers to data sent by an application (e.g., voice or packet data), signaling refers to data sent to support system operation (e.g., control data), and pilot refers to data that is known a priori by both a transmitter and a receiver. The different types of data may have different requirements and may be transmitted in different manners, e.g., at different rates and in different time intervals. Since signaling and pilot represent overhead, it is desirable for the terminals to transmit signaling and pilot as efficiently as possible.

There is therefore a need in the art for efficient transmission techniques in a multiple-access system.

SUMMARY

Techniques to efficiently transmit different types of data in a single-carrier frequency division multiple access (SC-FDMA) system are described herein. The SC-FDMA system may utilize (1) interleaved FDMA (IFDMA) to transmit on frequency subbands that are distributed across a frequency band or overall system bandwidth (2) localized FDMA (LFDMA) to transmit on a group of adjacent subbands, or (3) enhanced FDMA (EFDMA) to transmit data and pilot on multiple groups of adjacent subbands. IFDMA is also called distributed FDMA, and LFDMA is also called narrowband FDMA, classical FDMA, and FDMA.

In an embodiment, a transmitter (e.g., a terminal) generates modulation symbols for different types of data (e.g., traffic data, signaling, and pilot) and performs code division multiplexing (CDM) on one or more data types. CDM may be applied to traffic data, signaling, pilot, or any combination thereof. For example, the transmitter may apply CDM on signaling and/or pilot sent on frequency subbands and symbol periods that are also used by at least one other transmitter. To apply CDM to a given data type (e.g., signaling), the transmitter performs spreading on the modulation symbols for that data type with an assigned spreading code (e.g., a Walsh code). CDM may be applied across symbols, across samples, across both samples and symbols, across frequency subbands, and so on, as described below. The transmitter may also perform scrambling after the spreading. The transmitter generates SC-FDMA symbols of the same or different symbol durations for traffic data, signaling, and pilot and transmits the SC-FDMA symbols to a receiver. The receiver performs the complementary processing to recover the transmitted data.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The transmission techniques described herein may be used for various communication systems. For example, these techniques may be used for an SC-FDMA system that utilizes IFDMA, LFDMA, or EFDMA, an OFDMA system that utilizes orthogonal frequency division multiplexing (OFDM), other FDMA systems, other OFDM-based systems, and so on. Modulation symbols are sent in the time domain with IFDMA, LFDMA, and EFDMA and in the frequency domain with OFDM. In general, the techniques may be used for a system that utilizes one or more multiplexing schemes for the forward and reverse links. For example, the system may utilize (1) SC-FDMA (e.g., IFDMA, LFDMA or EFDMA) for both the forward and reverse links (2) one version of SC-FDMA (e.g., LFDMA) for one link and another version of SC-FDMA (e.g., IFDMA) for the other link, (3) SC-FDMA for the reverse link and OFDMA for the forward link, or (4) some other combination of multiplexing schemes. SC-FDMA, OFDMA, some other multiplexing scheme, or a combination thereof may be used for each link to achieve the desired performance. For example, SC-FDMA and OFDMA may be used for a given link, with SC-FDMA being used for some subbands and OFDMA being used on other subbands. It may be desirable to use SC-FDMA on the reverse link to achieve lower PAPR and to relax the power amplifier requirements for the terminals. It may be desirable to use OFDMA on the forward link to potentially achieve higher system capacity.

The techniques described herein may be used for the forward and reverse links. The techniques may also be used for (1) an orthogonal multiple-access system in which all users within a given cell or sector are orthogonal in time, frequency and/or code and (2) a quasi-orthogonal multiple-access system in which multiple users within the same cell or sector may transmit simultaneously on the same frequency at the same time. A quasi-orthogonal SC-FDMA system supports space division multiple access (SDMA), which uses multiple antennas located at different points in space to support simultaneous transmissions for multiple users.

Figure 1:
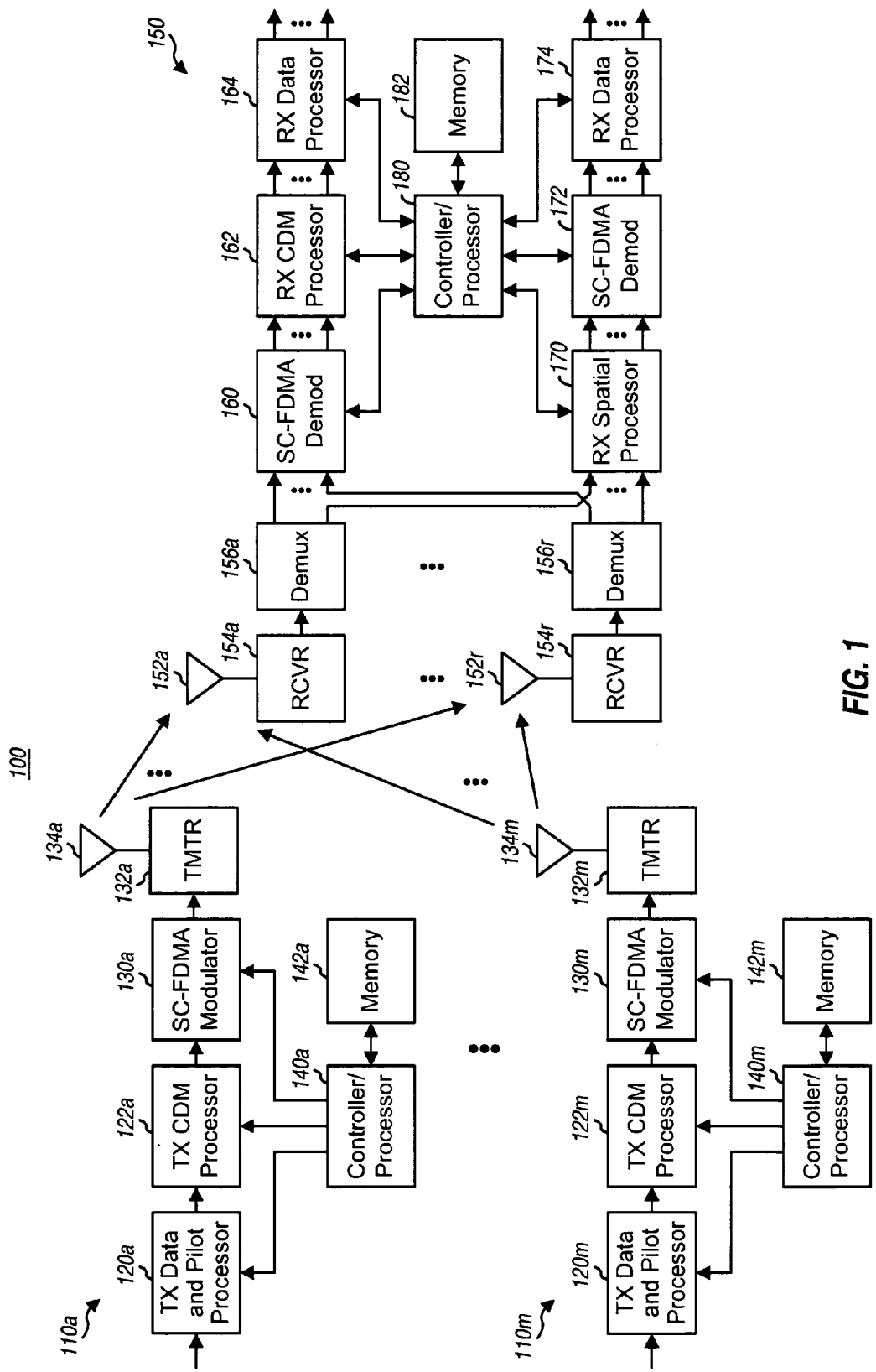
FIG. 1 shows a system with multiple transmitters and a receiver.

FIG. 1 shows an SC-FDMA system 100 with multiple (M) transmitters 110*a* through 110*m* and a receiver 150. For simplicity, each transmitter 110 is equipped with a single antenna 134, and receiver 150 is equipped with multiple (R) antennas 152*a* through 152*r*. For the reverse link, each transmitter 110 may be part of a terminal, and receiver 150 may be part of a base station. For the forward link, each transmitter 110 may be part of a base station, and receiver 150 may be part of a terminal. A base station is generally a fixed station and may also be called a base transceiver system (BTS), an access point, or some other terminology. A terminal may be fixed or mobile and may be a wireless device, a cellular phone, a personal digital assistant (PDA), a wireless modem card, and so on.

At each transmitter 110, a transmit (TX) data and pilot processor 120 encodes, interleaves, symbol maps traffic data and signaling and generates data symbols. The same or different coding and modulation schemes may be used for traffic data and signaling, which are collectively referred to as "data" in portions of the description below. Processor 120 also generates pilot symbols and multiplexes the data symbols and pilot symbols. As used herein, a data symbol is a modulation symbol for data, a pilot symbol is a modulation symbol for pilot, a modulation symbol is a complex value for a point in a signal constellation (e.g., for PSK or QAM), and a symbol is a complex value. A TX CDM processor 122 performs spreading for each type of data to be transmitted with CDM. An SC-FDMA modulator 130 performs SC-FDMA modulation (e.g., for IFDMA, LFDMA, or EFDMA) and generates SC-FDMA symbols. An SC-FDMA symbol may be an IFDMA symbol, an LFDMA symbol, or an EFDMA symbol. A data SC-FDMA symbol is an SC-FDMA symbol for data, and a pilot SC-FDMA symbol is an SC-FDMA symbol for pilot. A transmitter unit (TMTR) 132 processes (e.g., converts to analog, amplifies, filters, and frequency upconverts) the SC-FDMA symbols and generates a radio frequency (RF) modulated signal, which is transmitted via antenna 134.

At receiver 150, R antennas 152*a* through 152*r* receive the RF modulated signals from transmitters 110*a* through 110*m*, and each antenna provides a received signal to an associated receiver unit (RCVR) 154. Each receiver unit 154 conditions (e.g., filters, amplifies, frequency downconverts, and digitizes) its received signal and provides input samples to an associated demultiplexer (Demux) 156. Each demultiplexer 156 provides input samples for SC-FDMA symbols sent with CDM to an SC-FDMA demodulator (Demod) 160 and provides input samples for SC-FDMA symbols sent without CDM to an RX spatial processor 170. SC-FDMA demodulator 160 performs SC-FDMA demodulation on the input samples and provides received symbols. An RX CDM processor 162 performs the complementary despreading and provides detected data symbols. An RX data processor 164 processes the detected data symbols to recover the data sent with CDM.

RX spatial processor 170 performs receiver spatial processing for each subband used by multiple transmitters and separates out the data symbols sent by these transmitters. RX spatial processor 170 also demultiplexes the detected SC-FDMA symbols for each transmitter. An SC-FDMA demodulator 172 performs SC-FDMA demodulation on the detected SC-FDMA symbols for each transmitter and provides data symbol estimates for that transmitter, which are estimates of the data symbols sent by the transmitter. An RX data processor 174 symbol demaps, deinterleaves, and decodes the data symbol estimates for each transmitter and provides decoded data for that transmitter. In general, the processing by receiver 150 is complementary to the processing by transmitters 110*a* through 110*m*.

Controllers 140*a* through 140*m* and controller 180 direct the operation of various processing units at transmitters 110*a* through 110*m* and receiver 150, respectively. Memories 142*a* through 142*m* and memory 182 store program codes and data for transmitters 110*a* through 110*m* and receiver 150, respectively.

System 100 may utilize IFDMA, LFDMA, or EFDMA for transmission. The subband structures and symbol generation for IFDMA, LFDMA, and EFDMA are described below.

Figure 2A:
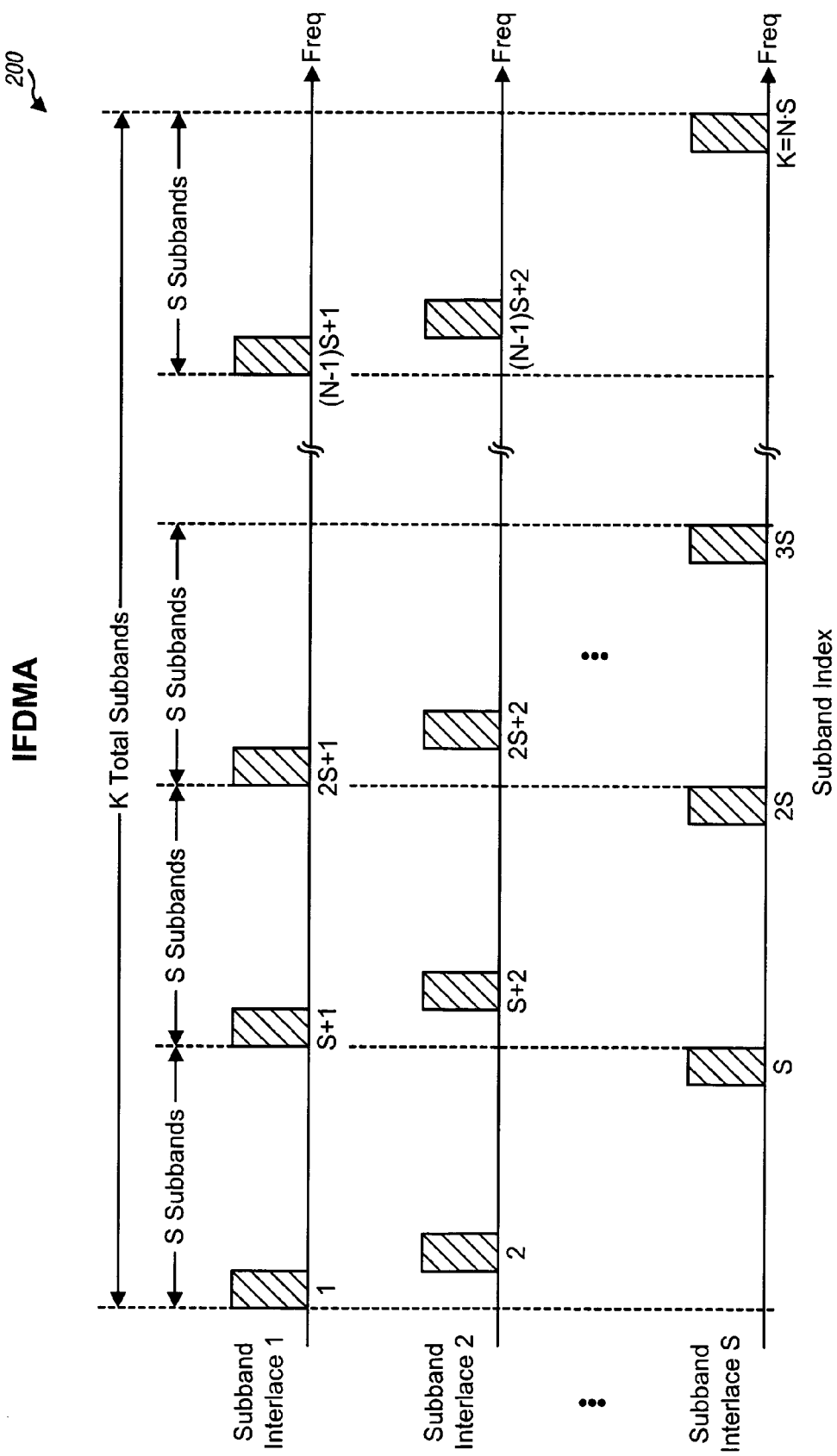
FIG. 2A shows an exemplary subband structure for IFDMA.

FIG. 2A shows an exemplary subband structure 200 for IFDMA. The overall system bandwidth of BW MHz is partitioned into multiple (K) orthogonal subbands that are given indices of 1 through K, where K may be any integer value. The spacing between adjacent subbands is BW/K MHz. For simplicity, the following description assumes that all K total subbands are usable for transmission. For subband structure 200, the K subbands are arranged into S disjoint or non-overlapping interlaces. The S interlaces are disjoint in that each of the K subbands belongs in only one interlace. In an embodiment, each interlace contains N subbands that are uniformly distributed across the K total subbands, consecutive subbands in each interlace are spaced apart by S subbands, and interlace u contains subband u as the first subband, where $K = S \cdot N$ and $u \in \{1, \ldots, S\}$. In general, a subband structure may include any number of interlaces, each interlace may contain any number of subbands, and the interlaces may contain the same or different numbers of subbands. Furthermore, N may or may not be an integer divisor of K, and the N subbands may or may not be uniformly distributed across the K total subbands.

Figure 2B:
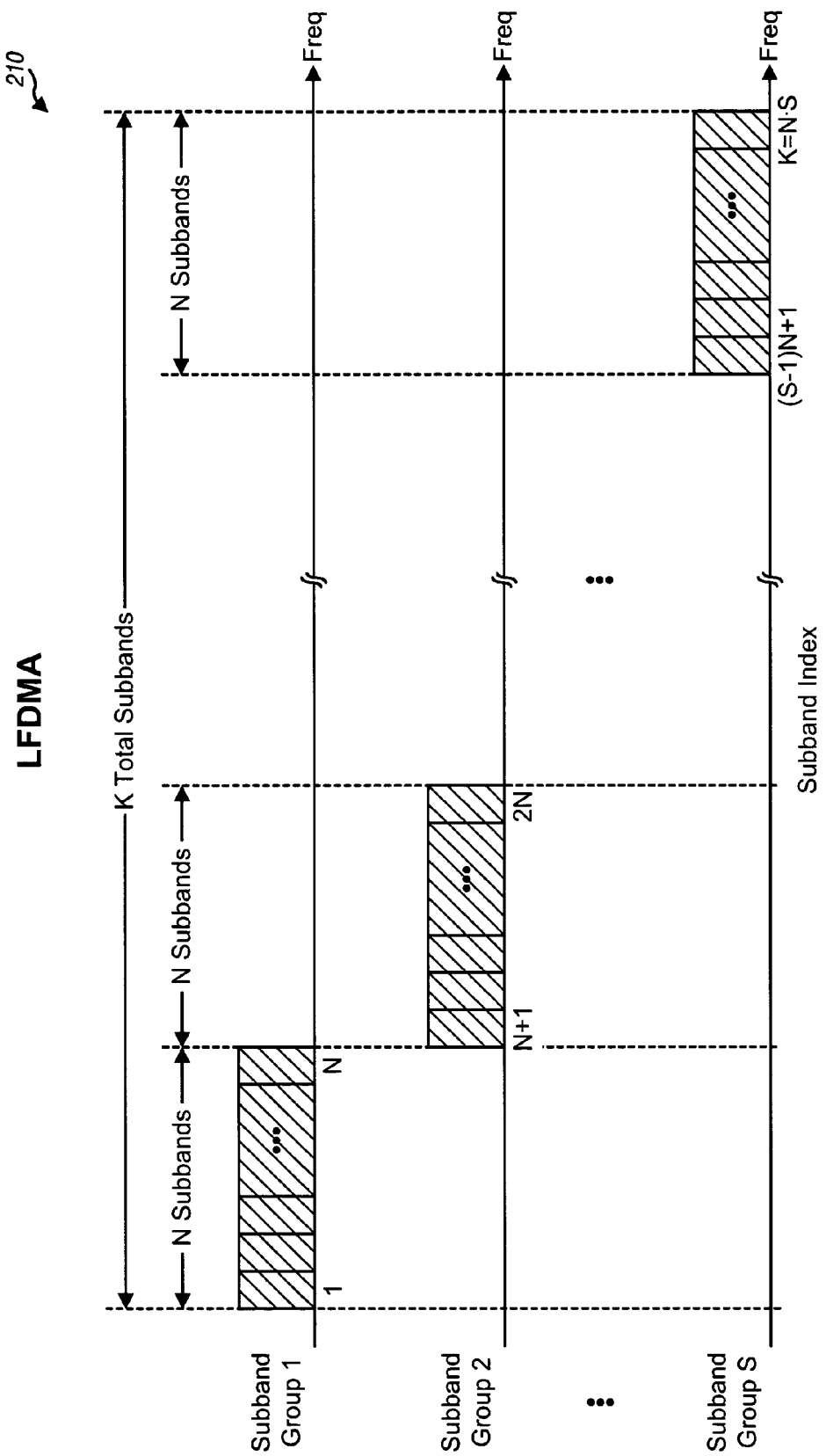
FIG. 2B shows an exemplary subband structure for LFDMA.

FIG. 2B shows an exemplary subband structure 210 for LFDMA. For subband structure 210, the K total subbands are arranged into S non-overlapping groups. In an embodiment, each group contains N subbands that are adjacent to one another, and group v contains subbands (v−1)·N+1 through v·N, where v is the group index and v ∈ {1, ..., S}. N and S for subband structure 210 may be the same or different from N and S for subband structure 200. In general, a subband structure may include any number of groups, each group may contain any number of subbands, and the groups may contain the same or different numbers of subbands.

Figure 2C:
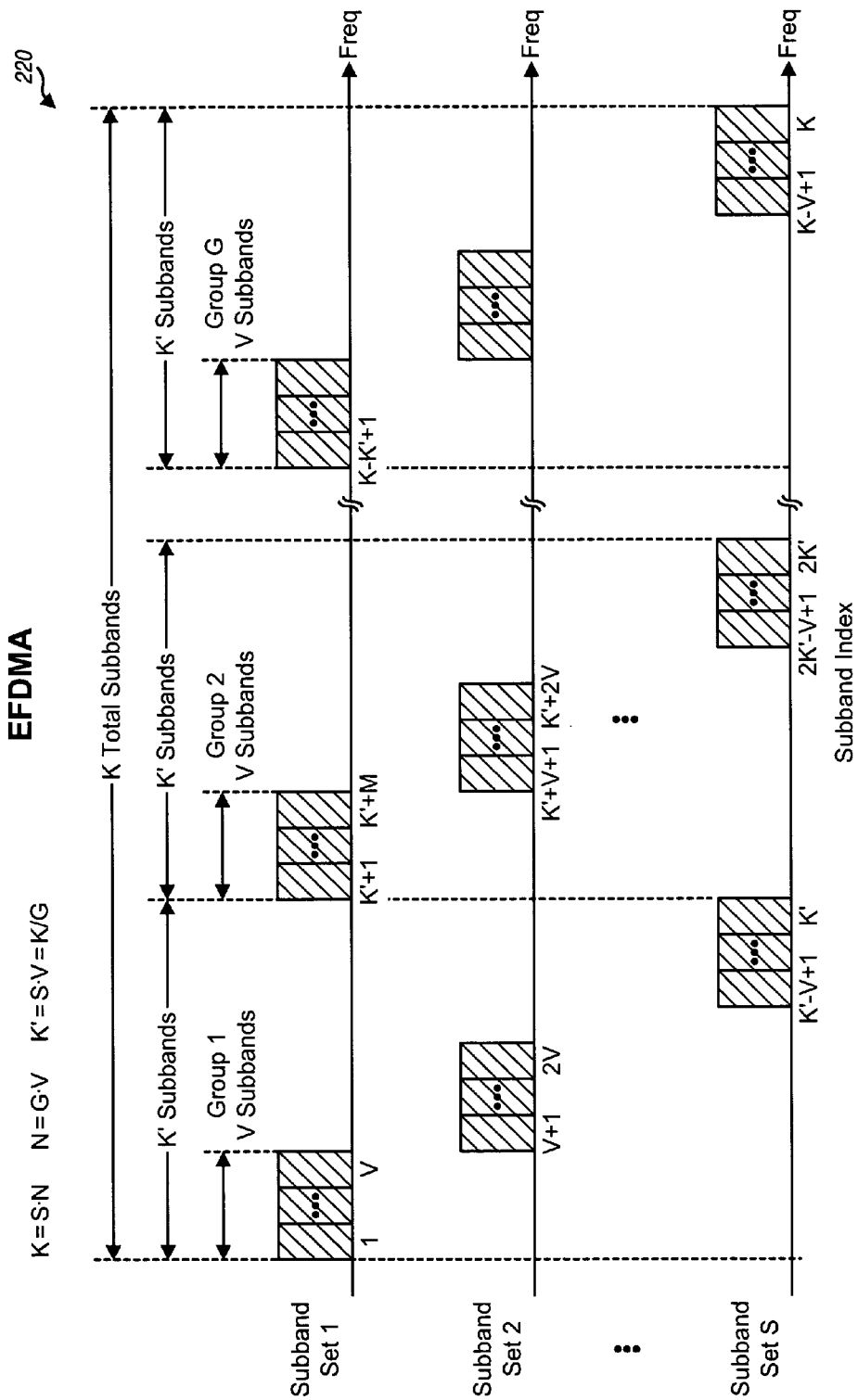
FIG. 2C shows an exemplary subband structure for EFDMA.

FIG. 2C shows an exemplary subband structure 220 for EFDMA. For subband structure 220, the K total subbands are arranged into S non-overlapping sets, with each set including G groups of subbands. In an embodiment, the K total subbands are distributed to the S sets as follows. The K total subbands are first partitioned into multiple frequency ranges, with each frequency range containing K'=K/G consecutive subbands. Each frequency range is further partitioned into S groups, with each group including V consecutive subbands. For each frequency range, the first V subbands are allocated to set 1, the next V subbands are allocated to set 2, and so on, and the last V subbands are allocated to set S. Set s, for s=1, ..., S, includes subbands having indices k that satisfy the following: (s−1)·V≤k modulo (K/G)<s·V. Each set contains G groups of V consecutive subbands, or a total of N=G·V subbands. In general, a subband structure may include any number of sets, each set may contain any number of groups and any number of subbands, and the sets may contain the same or different numbers of subbands. For each set, the groups may contain the same or different numbers of subbands and may be distributed uniformly or non-uniformly across the system bandwidth.

An SC-FDMA system may also utilize a combination of IFDMA, LFDMA, and/or EFDMA. For example, multiple interlaces may be formed for each subband group, and each interlace may be allocated to one or more users for transmission. As another example, multiple subband groups may be formed for each interlace, and each subband group may be allocated to one or more users for transmission. IFDMA, LFDMA, EFDMA, and variants and combinations thereof may be considered as different versions of SC-FDMA. In general, the techniques described herein may be used for any subband structure with any number of subband sets and where each subband set may include any number of subbands that may be arranged in any manner. For each subband set, (1) the subbands may be individually and either uniformly or non-uniformly distributed across the system bandwidth, (2) the subbands may be adjacent to one another in one group, or (3) the subbands may be distributed in multiple groups, where each group may be located anywhere in the system bandwidth and may contain one or multiple subbands.

Figure 3A:
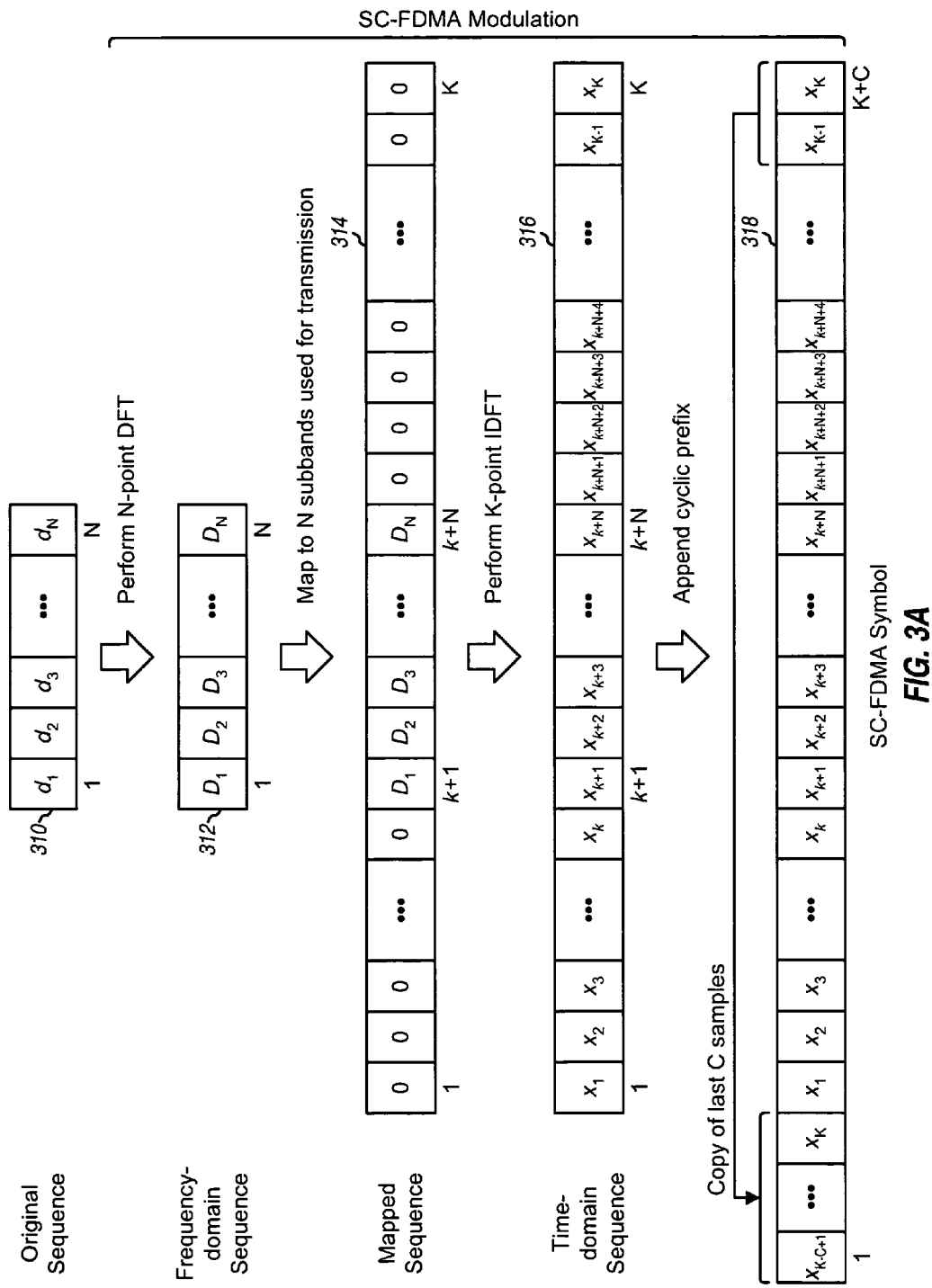
FIG. 3A shows the generation of an IFDMA, LFDMA or EFDMA symbol.

FIG. 3A shows the generation of an IFDMA symbol for one interlace, an

LFDMA symbol for one subband group, or an EFDMA symbol for one subband set. An original sequence of N modulation symbols to be transmitted in one symbol period on the interlace, subband group, or subband set is denoted as {$d_1$, $d_2$, $d_3$, ..., $d_n$} (block 310). The original sequence is transformed to the frequency domain with an N-point discrete Fourier transform (DFT) to obtain a sequence of N frequency-domain values (block 312). The N frequency-domain values are mapped onto the N subbands used for transmission, and K−N zero values are mapped onto the remaining K−N subbands to generate a sequence of K values (block 314). The N subbands used for transmission are in one group of adjacent subbands for LFDMA (as shown in FIG. 3A), are in one interlace with subbands distributed across the K total subbands for IFDMA (not shown in FIG. 3A), and are in one set of multiple groups of subbands for EFDMA (also not shown in FIG. 3A). The sequence of K values is then transformed to the time domain with a K-point inverse discrete Fourier transform (IDFT) to obtain a sequence of K time-domain output samples (block 316).

The last C output samples of the sequence are copied to the start of the sequence to form an IFDMA, LFDMA, or EFDMA symbol that contains K+C output samples (block 318). The C copied output samples are often called a cyclic prefix or a guard interval, and C is the cyclic prefix length. The cyclic prefix is used to combat intersymbol interference (ISI) caused by frequency selective fading, which is a frequency response that varies across the system bandwidth.

Figure 3B:
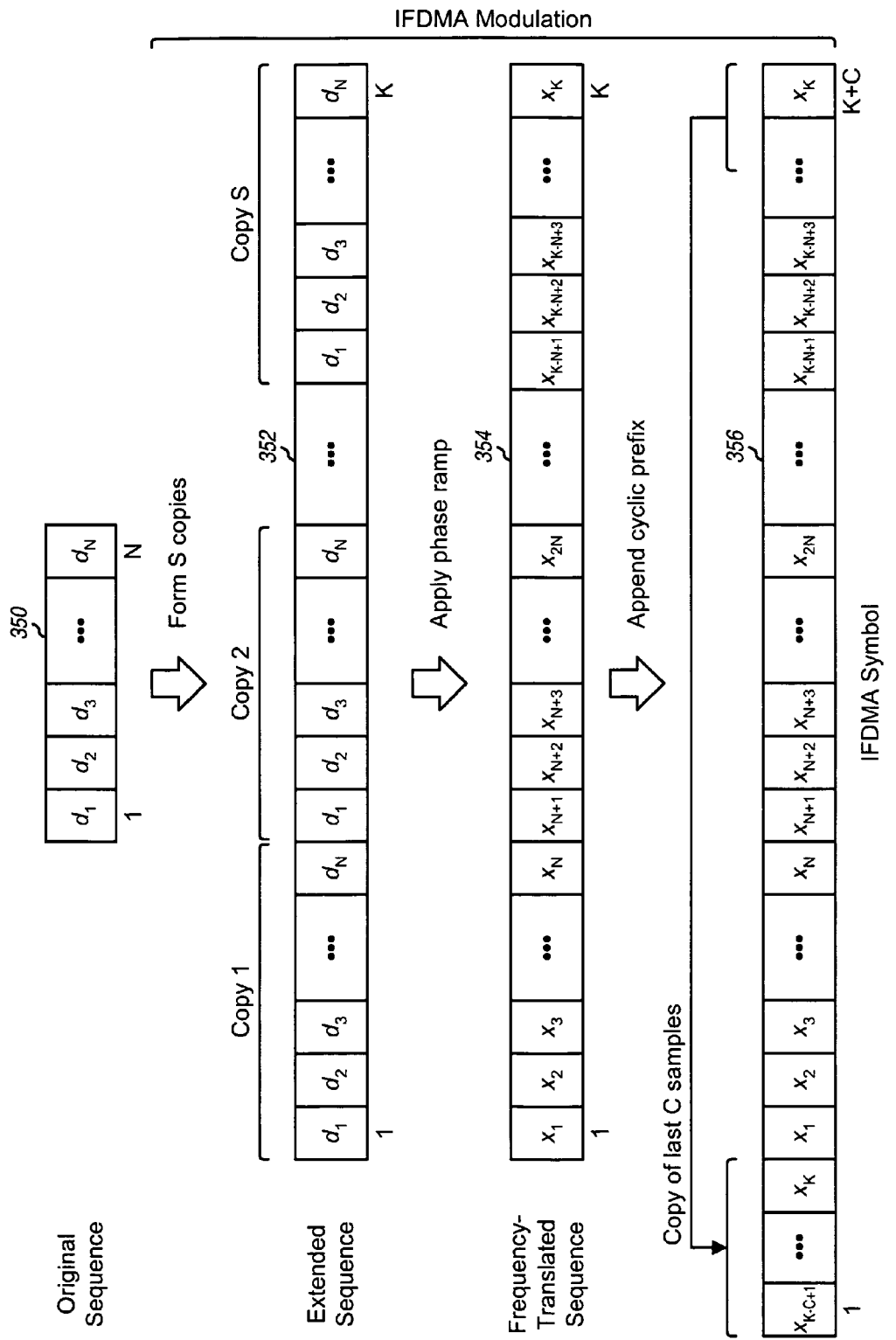
FIG. 3B shows the generation of an IFDMA symbol.

FIG. 3B shows the generation of an IFDMA symbol for one interlace for the case in which N is an integer divisor of K and the N subbands are uniformly distributed across the K total subbands. An original sequence of N modulation symbols to be transmitted in one symbol period on the N subbands in interlace u is denoted as {$d_1$, $d_2$, $d_3$, ..., $d_N$} (block 350). The original sequence is replicated S times to obtain an extended sequence of K modulation symbols (block 352). The N modulation symbols are sent in the time domain and collectively occupy N subbands in the frequency domain. The S copies of the original sequence result in the N occupied subbands being spaced apart by S subbands, with S−1 subbands of zero power separating adjacent occupied subbands. The extended sequence has a comb-like frequency spectrum that occupies interlace 1 in FIG. 2A.

The extended sequence is multiplied with a phase ramp to obtain a frequency-translated sequence of K output samples (block 354). Each output sample in the frequency-translated sequence may be generated as follows:

$$x_n = d_n \cdot e^{-j2\pi \cdot (n-1) \cdot (u-1)/K}, \text{ for } n=1, \ldots, K, \quad \text{Eq (1)}$$

where $d_n$ is the n-th modulation symbol in the extended sequence, $x_n$ the n-th output sample in the frequency-translated sequence, and u is the index of the first subband in the interlace. The multiplication with the phase ramp $e^{-j2\pi \cdot (n-1) \cdot (u-1)/K}$ in the time domain results in the frequency-translated sequence occupying interlace u in the frequency domain. The last C output samples of the frequency-translated sequence are copied to the start of the frequency-translated sequence to form an IFDMA symbol that contains K+C output samples (block 356).

The processing shown in FIG. 3A may be used to generate IFDMA, LFDMA and EFDMA symbols for any values of N and K. The processing shown in FIG. 3B may be used to generate an IFDMA symbol for the case in which N is an integer divisor of K and the N subbands are uniformly distributed across the K total subbands. The IFDMA symbol generation in FIG. 3B does not require a DFT or an IDFT and may thus be used whenever possible. IFDMA, LFDMA and EFDMA symbols may also be generated in other manners.

The K+C output samples of an SC-FDMA symbol (which may be an IFDMA, LFDMA or EFDMA symbol) are transmitted in K+C sample periods, one output sample in each sample period. An SC-FDMA symbol period (or simply, a symbol period) is the duration of one SC-FDMA symbol and is equal to K+C sample periods. A sample period is also called a chip period.

As generically used herein, a subband set is a set of subbands, which may be an interlace for IFDMA, a subband group for LFDMA, or a set of multiple subband groups for EFDMA. For the reverse link, S users may simultaneously transmit on S subband sets (e.g., S interlaces or S subband groups) to a base station without interfering with one another. For the forward link, the base station may simultaneously transmit on the S subband sets to S users without interference.

Figure 4:
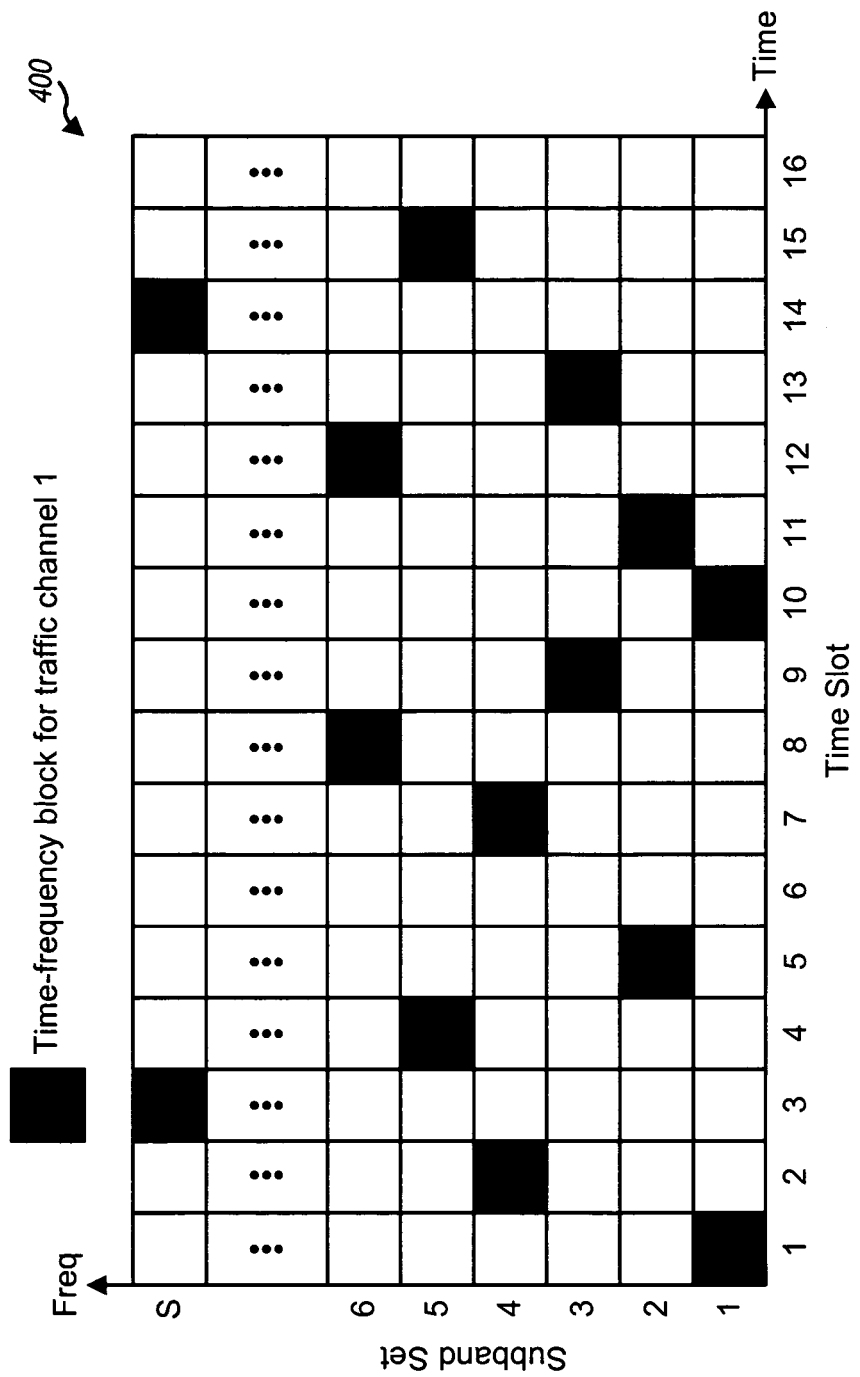
FIG. 4 shows a frequency hopping (FH) scheme.

FIG. 4 shows a frequency hopping (FH) scheme 400 that may be used for the forward and/or reverse link. Frequency hopping can provide frequency diversity and interference randomization. With frequency hopping, a user may be assigned a traffic channel that is associated with a hop pattern that indicates which subband set(s), if any, to use in each time slot. A hop pattern is also called an FH pattern or sequence, and a time slot is also called a hop period. A time slot is the amount of time spent on a given subband set and typically spans multiple symbol periods. The hop pattern may pseudo-randomly select different subband sets in different time slots.

In an embodiment, one channel set is defined for each link. Each channel set contains S traffic channels that are orthogonal to one another so that no two traffic channels map to the same subband set in any given time slot. This avoids intra-cell/sector interference among users assigned to traffic channels in the same channel set. Each traffic channel is mapped to a specific sequence of time-frequency blocks based on the hop pattern for that traffic channel. A time-frequency block is a specific set of subbands in a specific time slot. For this embodiment, up to S users may be assigned the S traffic channels and would be orthogonal to one another. Multiple users may also be assigned the same traffic channel, and these overlapping users would share the same sequence of time-frequency blocks.

In another embodiment, multiple channel sets may be defined for each link. Each channel set contains S orthogonal traffic channels. The S traffic channels in each channel set may be pseudo-random with respect to the S traffic channels in each of the remaining channel sets. This randomizes interference among users assigned with traffic channels in different channel sets.

FIG. 4 shows an exemplary mapping of traffic channel 1 to a sequence of time-frequency blocks. Traffic channels 2 through S may be mapped to vertically and circularly shifted versions of the time-frequency block sequence for traffic channel 1. For example, traffic channel 2 may be mapped to subband set 2 in time slot 1, subband set 5 in time slot 2, and so on.

In general, multiple users may overlap in a deterministic manner (e.g., by sharing the same traffic channel), a pseudo-random manner (e.g., by using two pseudo-random traffic channels), or a combination of both.

With quasi-orthogonal SC-FDMA, multiple transmitters may transmit on a given time-frequency block. Traffic data, signaling, and/or pilot for these transmitters may be multiplexed using CDM, time division multiplexing (TDM), frequency division multiplexing (FDM), localized frequency division multiplexing (LFDM), and/or some other multiplexing scheme.

Figure 5:
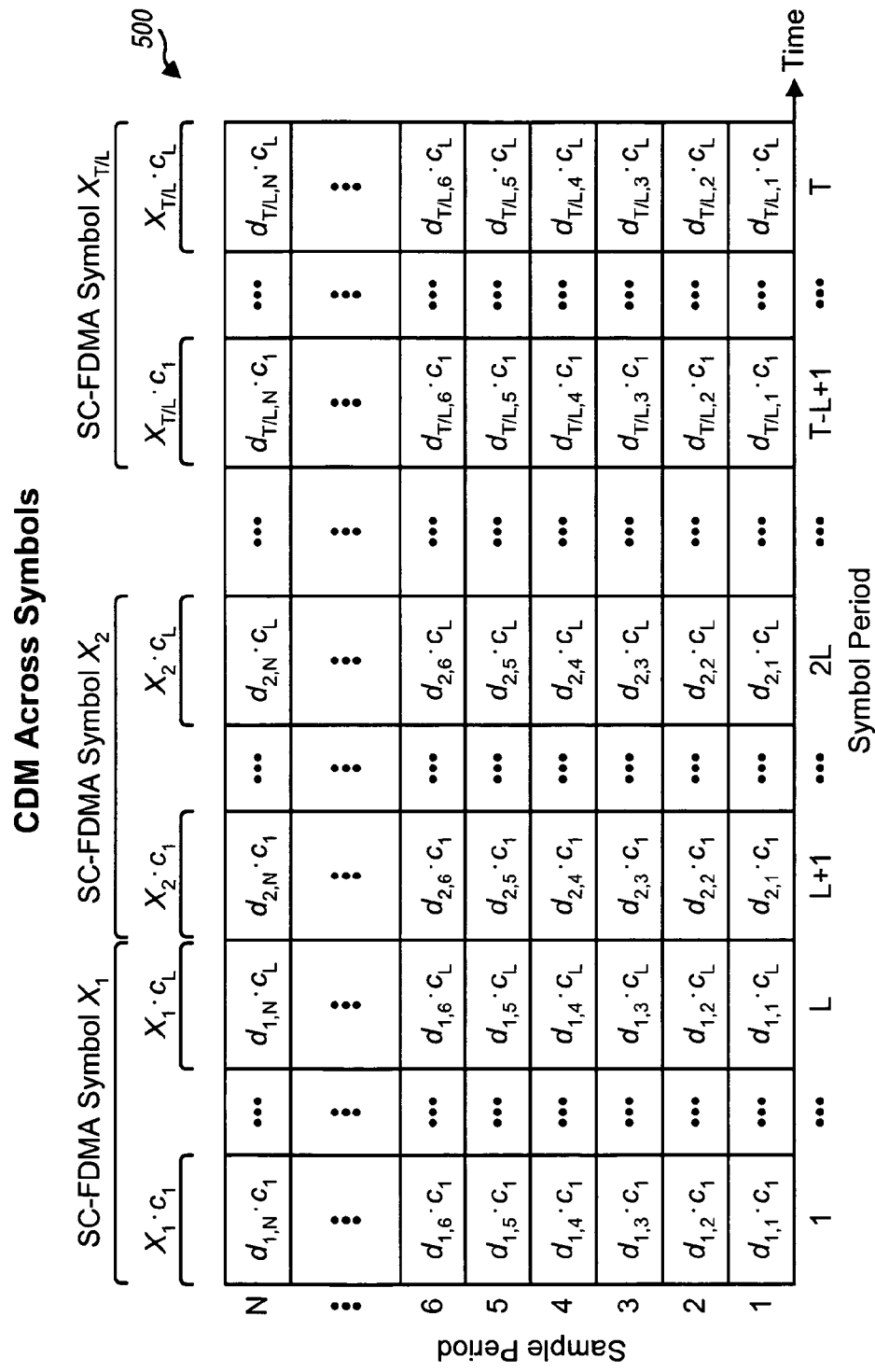
FIG. 5 shows a transmission scheme with CDM across symbols.

FIG. 5 shows a transmission scheme 500 with CDM applied across symbols. Multiple (Q) transmitters are mapped to the same time-frequency block and are assigned Q different spreading codes. The spreading codes may be Walsh codes, OVSF codes, orthogonal codes, pseudo-random codes, and so on. Each spreading code is a sequence of L chips that is denoted as $\{c_1, c_2, \ldots, c_L\}$, where $L \geq Q$. CDM may be applied on either (1) the modulation symbols prior to SC-FDMA modulation or (2) the SC-FDMA symbols after SC-FDMA modulation. For CDM prior to SC-FDMA modulation, a sequence of modulation symbols $\{d_{t,1}, d_{t,2}, \ldots, d_{t,N}\}$ is replicated L times, and the L replicated sequences are multiplied with the L chips of an assigned spreading code to generate L sequences of scaled modulation symbols. An SC-FDMA symbol is then generated for each sequence of scaled modulation symbols and transmitted in one symbol period. For CDM after SC-FDMA modulation, an SC-FDMA symbol $X_t$ containing K+C output samples is replicated L times, and the L replicated SC-FDMA symbols are multiplied with the L chips of the spreading code to generate L scaled SC-FDMA symbols $X_t \cdot c_1$ through $X_t \cdot c_L$, which are transmitted in L symbol periods.

For the example shown in FIG. 5, the first SC-FDMA symbol $X_1$ is multiplied with the L chips $c_1$ through $c_L$ and transmitted in symbol periods 1 through L, the next SC-FDMA symbol $X_2$ is multiplied with the L chips $c_1$ through $c_L$ and transmitted in symbol periods L+1 through 2L, and so on. Each SC-FDMA symbol $X_t$ may be for traffic data, signaling, pilot, or a combination thereof.

For CDM across symbol periods, the wireless channel is assumed to be static over the L symbol periods used to transmit an SC-FDMA symbol. To recover SC-FDMA symbol $X_t$, the receiver multiplies the L scaled SC-FDMA symbols received for that SC-FDMA symbol with the L chips of the assigned spreading code. The receiver then accumulates the L resultant SC-FDMA symbols to obtain a received SC-FDMA symbol for SC-FDMA symbol $X_t$.

Figure 6:
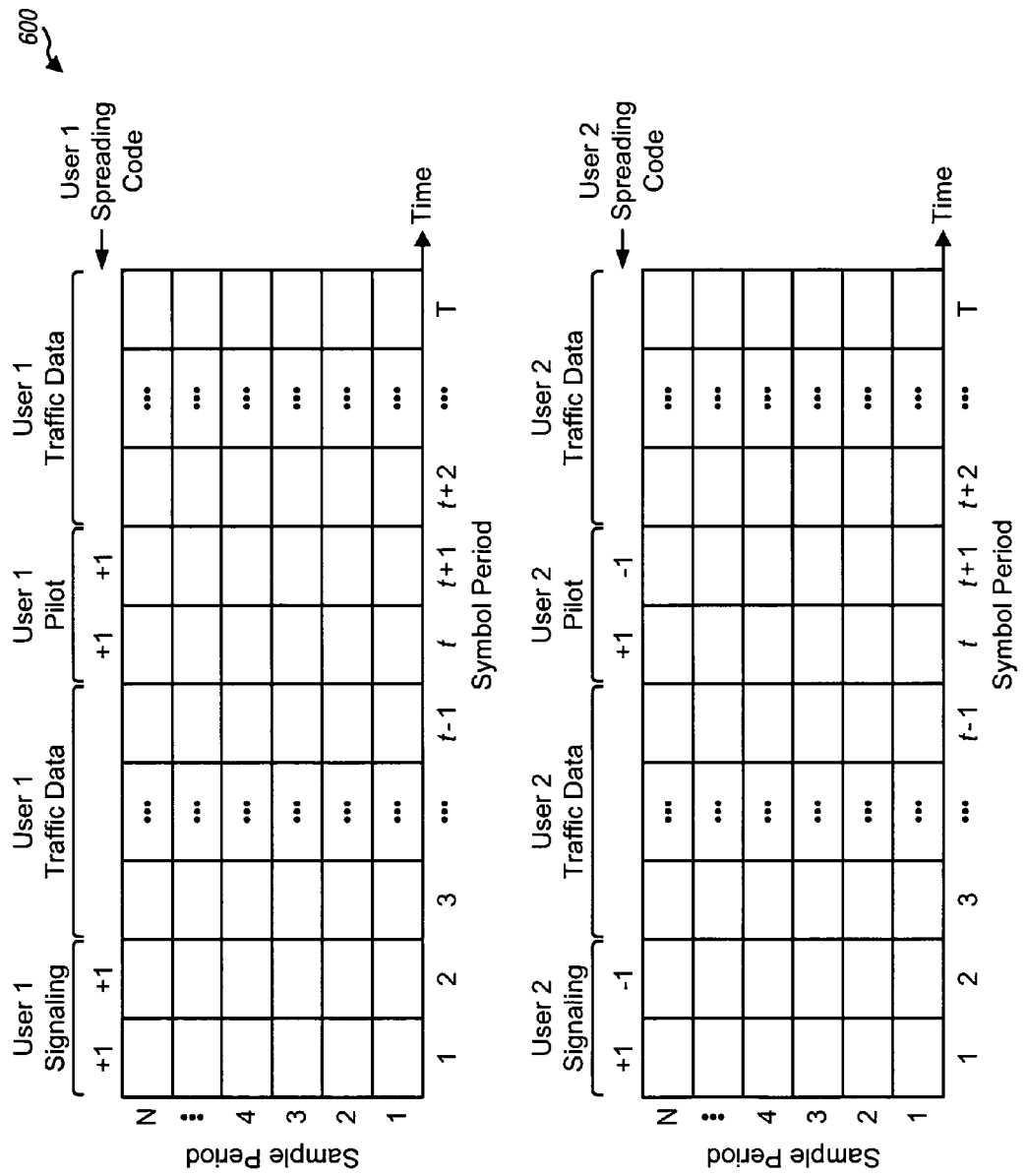
FIG. 6 shows transmissions for two transmitters with 2-chip spreading codes.

FIG. 6 shows exemplary transmissions for two transmitters with 2-chip spreading codes. For the example shown in FIG. 6, each transmitter transmits signaling in symbol periods 1 and 2, then traffic data in symbol periods 3 through t−1, then pilot in symbol periods t and t+1, then traffic data in symbol periods t+2 through T. Each transmitter generates SC-FDMA symbols in the normal manner, e.g., as shown in FIG. 3A or 3B. Transmitter 1 is assigned a spreading code of $\{+1, -1\}$, multiplies the SC-FDMA symbol for signaling with +1 and +1 to generate two scaled SC-FDMA symbols, and transmits these two scaled SC-FDMA symbols in symbol periods 1 and 2. Transmitter 1 also multiplies the SC-FDMA symbol for pilot with +1 and +1 to generate two scaled SC-FDMA symbols and transmits these two scaled SC-FDMA symbols in symbol periods t and t+1. Transmitter 2 is assigned a spreading code of $\{+1, -1\}$, multiplies the SC-FDMA symbol for signaling with +1 and −1 to generate two scaled SC-FDMA symbols, and transmits these two scaled SC-FDMA symbols in symbol periods 1 and 2. Transmitter 2 also multiplies the SC-FDMA symbol for pilot with +1 and −1 to generate two scaled SC-FDMA symbols and transmits these two scaled SC-FDMA symbols in symbol periods t and t+1. For the example shown in FIG. 6, transmitters 1 and 2 transmit SC-FDMA symbols for traffic data without CDM.

FIG. 6 shows transmission of traffic data, signaling, and pilot in one time-frequency block. In general, any type of data may be transmitted in a given time-frequency block. For example, traffic data and pilot may be transmitted in each time-frequency block assigned to a transmitter, and signaling may be transmitted as needed, e.g., periodically in every j-th time-frequency block, where j may be any integer value.

Figure 7:
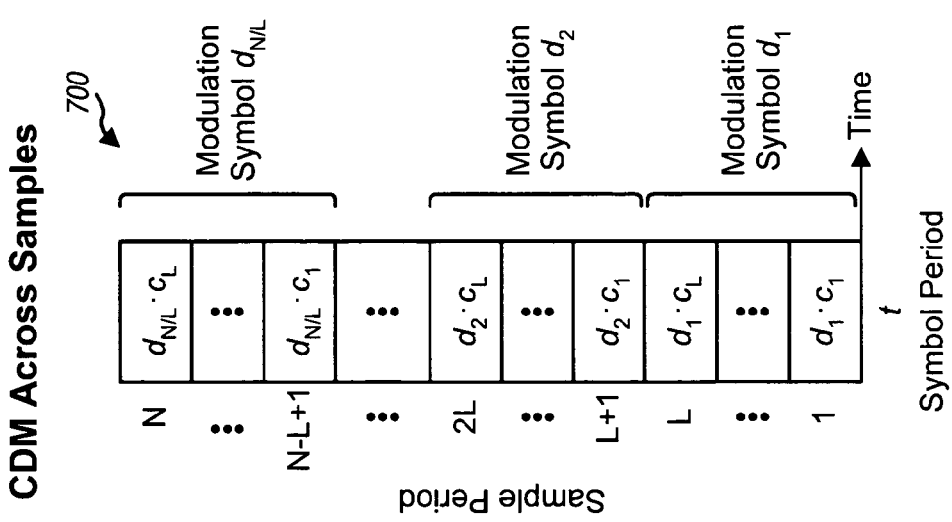
FIG. 7 shows a transmission scheme with CDM across samples.

FIG. 7 shows a transmission scheme 700 with CDM applied across samples. D modulation symbols may be sent on one set of N subbands in one symbol period, where $D \leq 1$ and D may or may not be an integer divisor of N. Each modulation symbol may be for traffic data, signaling, or pilot. Each modulation symbol is replicated L times, and the L replicated symbols are multiplied with the L chips of the assigned spreading code to generate L scaled modulation symbols. For simplicity, FIG. 7 shows the transmission of one SC-FDMA symbol in one symbol period, with D being an integer divisor of N, or D=N/L. The first modulation symbol $d_1$ is multiplied with the L chips $c_1$ through $c_L$ to obtain L scaled modulation symbols $s_1=d_1 \cdot c_1$ through $s_L=d_1 \cdot c_L$, the next modulation symbol $d_2$ is multiplied with the L chips $c_1$ through $c_L$ to obtain L modulation symbols $s_{L+1}=d_2 \cdot c_1$ through $s_{2L}=d_2 \cdot c_L$, and so on, and the last modulation symbol $d_{N/L}$ is multiplied with the L chips $c_1$ through $c_L$ to obtain L scaled modulation symbols $s_{N-L+1}=d_{N/L} \cdot c_1$ through $s_N=d_{N/L} \cdot c_L$. An SC-FDMA symbol may be generated based on the N scaled modulation symbols $s_1$ through $s_N$. If L=N, then one modulation symbol is sent across all N samples in a symbol period.

To recover a given modulation symbol $d_n$, the receiver multiplies the L scaled modulation symbols received for that modulation symbol with the L chips of the assigned spreading code. The receiver then accumulates the L resultant symbols to obtain a received modulation symbol for modulation symbol $d_n$.

Figure 8:
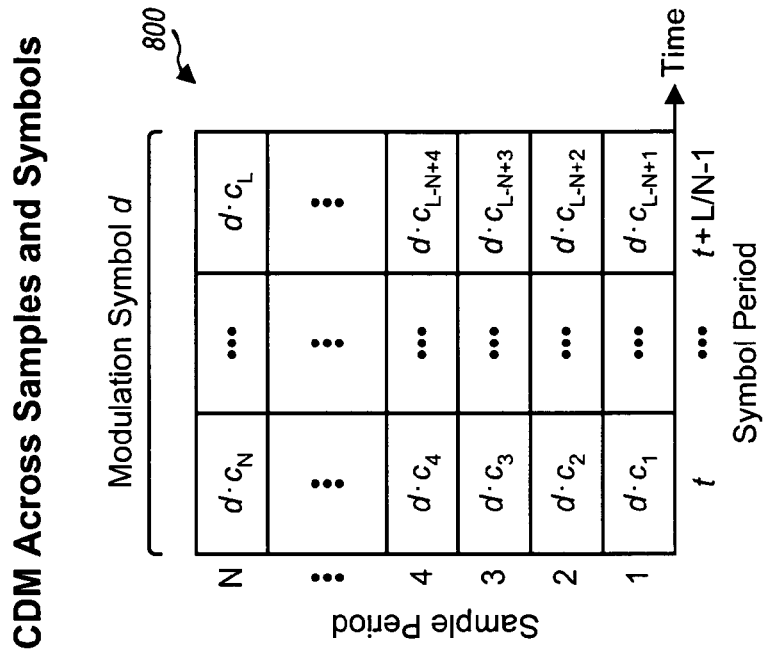
FIG. 8 shows a transmission scheme with CDM across samples and symbols.

FIG. 8 shows a transmission scheme 800 with CDM applied across samples and symbols. A modulation symbol d may be sent on one set of N subbands in multiple symbol periods. The modulation symbol is replicated L times and multiplied with all L chips of the assigned spreading code to generate L scaled modulation symbols. For simplicity, FIG. 8 shows the case in which L is an integer multiple of N, and the modulation symbol is sent in L/N symbol periods. Modulation symbol d is multiplied with the first N chips $c_1$ through $c_N$ of the assigned spreading code to obtain N scaled modulation symbols $s_1=d \cdot c_1$ through $s_N=d \cdot c_N$ for the first SC-FDMA symbol, multiplied with the next N chips $c_{N+1}$ through $c_{2N}$ to obtain N scaled modulation symbols $s_{N+1}=d \cdot c_{N+1}$ through $s_{2N}=d \cdot c_{2N}$ for the second SC-FDMA symbol, and so on, and multiplied with the last N chips $c_{L-N+1}$ through $c_L$ to obtain N scaled modulation symbols $s_{L-N+1}=d \cdot c_{L-N+1}$ through $s_L=d \cdot c_L$ for the last SC-FDMA symbol. An SC-FDMA symbol may be generated for each sequence of N scaled modulation symbols.

To recover modulation symbol d sent across symbols and samples, the receiver multiplies the L scaled modulation symbols received for that modulation symbol with the L chips of the assigned spreading code. The receiver then accumulates the L resultant symbols to obtain a received modulation symbol for modulation symbol d.

FIGS. 5 through 8 show various schemes for applying CDM in the time domain. Other schemes for applying CDM in the time domain may also be implemented, and this is within the scope of the invention. For example, CDM may be applied across samples in only a portion of an SC-FDMA symbol, e.g., the first L samples of the SC-FDMA symbol. As another example, CDM may be applied across symbols for some sample indices and not applied for other sample indices. As yet another example, CDM may be applied on multiple modulation symbols, and each modulation symbol may be sent across both samples and symbols.

CDM may also be applied across subbands in the frequency domain. D modulation symbols may be sent on one set of N subbands in one symbol period, where D≥1 and D may or may not be an integer divisor of N. A D-point DFT may be performed on the D modulation symbols to obtain D frequency-domain values. Each frequency-domain value is then replicated L times, and the L replicated values are multiplied with the L chips of the assigned spreading code to generate L scaled values. A total of N scaled values are obtained for the D frequency-domain values and are mapped onto the N subbands used for transmission. Zero values are mapped onto the remaining subbands. A K-point IDFT is then performed on the K scaled and zero values to generate K time-domain output samples. An SC-FDMA symbol is formed by appending a cyclic prefix to the K output samples. CDM across subbands is similar to CDM across samples shown in FIG. 7, albeit with the vertical axis representing subband (instead of sample period) and $d_1$ through $d_{N/L}$ representing the D frequency-domain values (instead of modulation symbols).

For CDM across subbands, the wireless channel is assumed to be static over the L subbands used to transmit a frequency-domain value, which are the subbands on which the L-chip spreading code is applied. To recover the D modulation symbols, the receiver obtains K+C input samples for the SC-FDMA symbol, removes the cyclic prefix, performs a K-point DFT on K input samples to obtain K received values, and retains N received values for the N subbands used for transmission. The receiver then multiplies the L received values for each transmitted frequency-domain value with the L chips of the spreading code, and accumulates the L resultant values to obtain a received frequency-domain value for the transmitted frequency-domain value. The receiver then performs a D-point IDFT on D received frequency-domain values to obtain D received modulation symbols.

In general, CDM may be applied in the time domain (e.g., as shown in FIGS. 5 through 8) or in the frequency domain. Applying CDM in the time domain may result in a lower peak-to-average power ratio (PAPR) than applying CDM in the frequency domain.

A transmitter may perform scrambling on the scaled and/or unscaled modulation symbols. Each transmitter may be assigned a scrambling code that is pseudo-random with respect to the scrambling codes assigned to other transmitters. Transmitter m may multiply each (scaled or unscaled) modulation symbol with a chip of an assigned scrambling code $S_m$ prior to SC-FDMA modulation. The scrambling randomizes the interference caused by transmitter m to other transmitters transmitting on the same time-frequency block. The scrambling also allows the receiver to estimate the interference from other cells based on the unassigned spreading codes (e.g., if different sectors use different scrambling codes, and all transmitters within a sector use the same scrambling code), as described below. Scrambling may be performed on all types of data, on certain types of data, on data sent with CDM, and so on.

In the description above, the SC-FDMA symbols for different types of data have the same duration, and each SC-FDMA symbol is transmitted in K+C sample periods. SC-FDMA symbols of different durations may be generated for different types of data.

Figure 9:
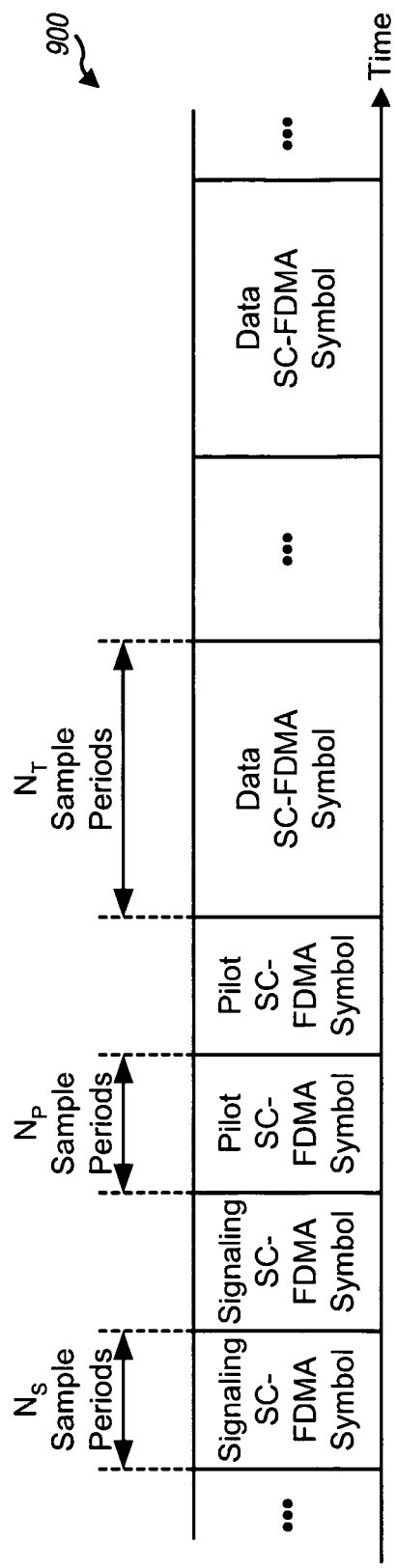
FIG. 9 shows use of different symbol durations for different types of data.

FIG. 9 shows a transmission scheme 900 with different symbol durations for different types of data. For transmission scheme 900, an SC-FDMA symbol for traffic data is composed of $N_T$ output samples that are transmitted in $N_T$ sample periods, an SC-FDMA symbol for signaling is composed of $N_S$ output samples that are transmitted in $N_S$ sample periods, and an SC-FDMA symbol for pilot is composed of $N_P$ output samples that are transmitted in $N_P$ sample periods, where $N_T$, $N_S$, and $N_P$ may each be any integer value. For example, $N_T$ may be equal to K+C, $N_S$ may be equal to $K/M_S$+C, and $N_P$ may be equal to $K/M_P$+C, where $M_S$ and $M_P$ may each be any integer value. As an example, a shortened SC-FDMA symbol for pilot may have half the duration of a normal SC-FDMA symbol for traffic data (not counting the cyclic prefix). In this case, there are K/2 total "wider" subbands for pilot, with each wider subband having twice the width of a "normal" subband for traffic data. As a specific example, K may be equal to 512, C may be equal to 32, $N_T$ may be equal to K+C=544, $N_S$ may be equal to K/2+C=288, and $N_P$ may also be equal to K/2+C=288. An SC-FDMA symbol with $N_T$, $N_S$, or $N_P$ output samples may be generated, e.g., as shown in FIG. 3A.

For LFDMA, a shortened SC-FDMA symbol and a normal SC-FDMA symbol may occupy the same portion of the system bandwidth. For IFDMA, there is no direct mapping between the wider subbands for a shortened SC-FDMA symbol and the normal subbands for a normal SC-FDMA symbol, for a given interlace. N wider subbands may be formed with multiple interlaces and divided into multiple subsets of wider subbands, which may be allocated to multiple transmitters assigned to these interlaces. Each transmitter may generate a shortened IFDMA symbol with the modulation symbols mapped onto the assigned subset of wider subbands.

CDM may be applied to SC-FDMA symbols of different durations. For the example shown in FIG. 9, a shortened SC-FDMA symbol may be generated for pilot and sent using CDM in L shortened symbol periods to reduce the amount of overhead of pilot. A shortened SC-FDMA symbol may also be generated for signaling and sent using CDM in L shortened symbol periods. Traffic data may be sent using normal SC-FDMA symbols.

In general, CDM may be applied to any type of data, e.g., traffic data, signaling, and/or pilot. For example, CDM may be applied to signaling and pilot but not traffic data, as shown in FIG. 6. As another example, CDM may be applied to signaling (e.g., for a control channel), but not traffic data or pilot. CDM may also be applied to a portion of a time slot (as shown in FIG. 6) or across an entire time-frequency block (e.g., as shown in FIG. 5). CDM may also be selectively applied, e.g., applied under poor channel conditions and not applied under good channel conditions.

CDM may improve reliability for a transmission sent in poor channel conditions. A transmitter may be constrained by a certain maximum transmit power level, which may be imposed by regulatory bodies or design limitations. In this case, a CDM transmission scheme allows the transmitter to transmit an SC-FDMA symbol over a longer time interval. This allows the receiver to collect more energy for the SC-FDMA symbol, which enables the receiver to perform detection at a lower SNR and/or derive a higher quality channel estimate. CDM may also whiten the interference caused to other transmitters, which may improve performance for these other transmitters.

Figure 10:
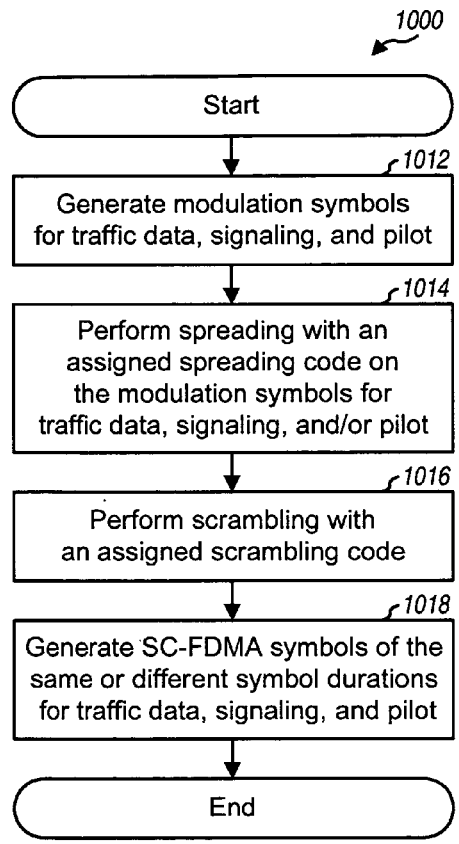
FIG. 10 shows a process for transmitting SC-FDMA symbols with CDM.

FIG. 10 shows a process 1000 for transmitting SC-FDMA symbols with CDM. Modulation symbols for traffic data, signaling, and pilot are generated (block 1012). CDM is performed with an assigned spreading code $C_m$ on the modulation symbols for traffic data, signaling, and/or pilot (block 1014). CDM may be performed for symbol periods used by multiple transmitters for transmission. CDM may also be performed across symbols, across samples, across both samples and symbols, across subbands, and so on. Scrambling may be performed with an assigned scrambling code $S_m$ after the spreading (block 1016). SC-FDMA symbols of the same or different durations are generated for traffic data, signaling, and pilot (block 1018) and transmitted to the receiver.

Figure 11:
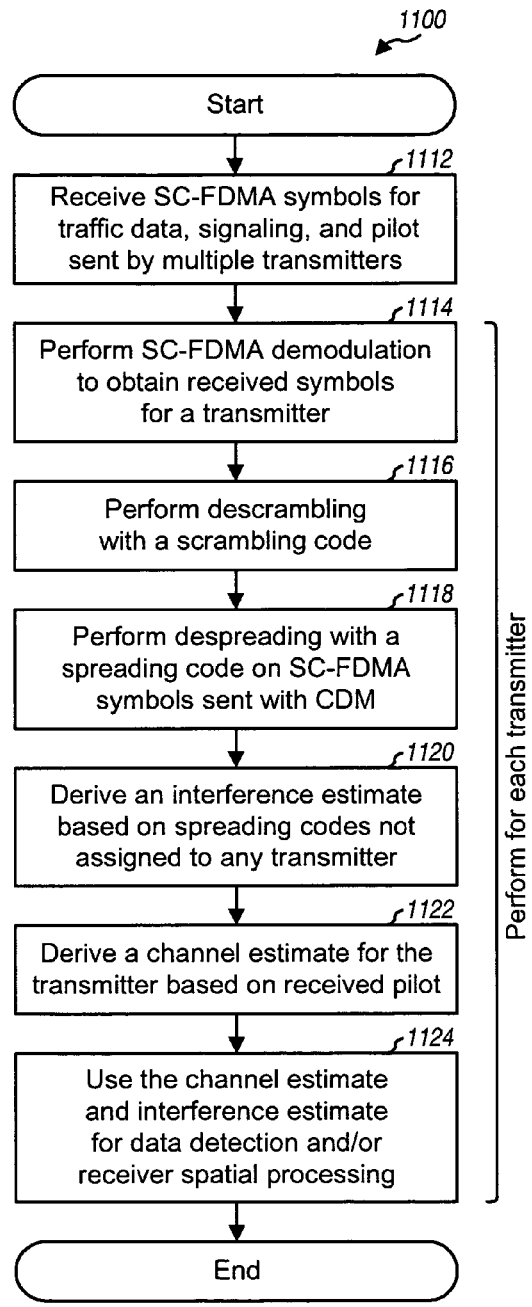
FIG. 11 shows a process for receiving SC-FDMA symbols sent with CDM.

FIG. 11 shows a process 1100 for receiving SC-FDMA symbols transmitted with CDM. SC-FDMA symbols are received for traffic data, signaling, and pilot sent by multiple transmitters (block 1112). Data transmitted with CDM may be separately recovered for each transmitter. The processing for one transmitter m may be performed as follows. SC-FDMA demodulation is performed to obtain received symbols for transmitter m (block 1114). Descrambling is performed (if applicable) on the received symbols with the scrambling code $S_m$ assigned to transmitter m (block 1116). Despreading is performed on SC-FDMA symbols sent with CDM based on the spreading code $C_m$ assigned to transmitter m (block 1118). An interference estimate may be derived based on the spreading codes not assigned to any transmitter (block 1120). A channel estimate may be derived for transmitter m based on a received pilot for the transmitter (block 1122). The channel estimate and interference estimate may be used for data detection (e.g., equalization), receiver spatial processing, and so on (block 1124). For example, coherent or non-coherent data detection may be performed for signaling sent with CDM, and receiver spatial processing may be performed for traffic data sent without CDM.

The receiver may derive an interference estimate during symbol periods in which CDM is applied. If L spreading codes are available and Q spreading codes are assigned to the transmitters, where Q<L, then the receiver may derive the interference estimate based on the L−Q unassigned spreading codes. For example, one or more spreading codes may be reserved for interference estimation and not assigned to any transmitter. For symbol periods in which CDM is applied, the receiver performs despreading with each of the Q assigned spreading codes to recover the transmissions sent by the transmitters. The receiver may also perform despreading with each of the L−Q unassigned spreading codes to obtain an interference estimate for that unassigned spreading code. For CDM across symbols, the interference estimate for an unassigned spreading code may be derived as follows:

$$N_j = \frac{1}{N \cdot L} \left| \sum_{n=1}^{N} \sum_{i=1}^{L} r(t_i, n) \cdot c_{i,j} \right|^2, \quad \text{Eq (2)}$$

where $r(t_i, n)$ is a received symbol for sample period n in symbol period $t_i$;

$c_{i,j}$ is the i-th chip of the j-th unassigned spreading code; and $N_j$ is an interference estimate for the j-th unassigned spreading code.

Equation (2) despreads and accumulates the received symbols across L symbol periods $t_1$ through $t_L$ and further averages the results across N sample periods. The receiver may average the interference estimates for all L−Q unassigned spreading codes to obtain an average interference estimate $\hat{N}_o$, as follows:

$$\hat{N}_0 = \frac{1}{L-Q} \cdot \sum_{j=1}^{L-Q} N_j. \quad \text{Eq (3)}$$

The receiver may also derive an interference estimate for CDM across samples and CDM across both samples and symbols. In general, the receiver may despread across samples and/or symbols in a manner complementary to the spreading performed by the transmitter and may then accumulate the despread results across the samples and/or symbols.

The receiver may average the interference estimate across samples, symbols, and/or subbands in a given time-frequency block to obtain a short-term interference estimate. The receiver may also average the interference estimate across multiple time-frequency blocks to obtain a long-term interference estimate. The receiver may use the short-term interference estimate for channel estimation, data detection, receiver spatial processing, and so on. The receiver may use the long-term interference estimate to ascertain the operating conditions and/or for other purposes For channel estimation, the receiver obtains a received SC-FDMA symbol for each symbol period used for pilot transmission by a given transmitter. The receiver may remove the cyclic prefix from the received SC-FDMA symbol, perform SC-FDMA demodulation, descrambling and despreading, and obtain received pilot values for the subbands used for pilot transmission. The received pilot values may be expressed as:

$$R_p(k) = H(k) \cdot P(k) + N(k), \text{ for } k \in K_p, \qquad \text{Eq (4)}$$

where $P(k)$ is a transmitted pilot value for subband k;
$H(k)$ is a complex gain for the wireless channel for subband k;
$R_p(k)$ is a received pilot value for subband k;
$N(k)$ is the noise and interference for subband k; and
$K_p$ is the set of subbands used for pilot transmission.

The receiver may estimate $N(k)$ based on the unassigned spreading codes, e.g., as described above. Alternatively, $N(k)$ may be assumed to be additive white Gaussian noise (AWGN) with zero mean and a variance of $N_0$.

The receiver may estimate the frequency response of the wireless channel using a minimum mean-square error (MMSE) technique or some other technique. For the MMSE technique, the receiver may derive an initial frequency response estimate for the wireless channel, as follows:

$$\hat{H}(k) = \frac{R_p(k) \cdot P^*(k)}{|P(k)|^2 + \hat{N}_0}, \qquad \text{Eq (5)}$$

for $$k \in K_p,$$

where $\hat{H}(k)$ is a channel gain estimate for subband k and "*" denotes a complex conjugate. If $|P(k)|=$b 1 for all values of k, then equation (5) may be expressed as:

$$\hat{H}(k) = \frac{R_p(k) \cdot P^*(k)}{1 + \hat{N}_0}, \qquad \text{Eq (6)}$$

for $$k \in K_p.$$

The receiver may also derive a channel estimate in other manners.

For data detection, the receiver obtains a received SC-FDMA symbol for each symbol period used for data transmission by the transmitter. The receiver may remove the cyclic prefix from the received SC-FDMA symbol, perform SC-FDMA demodulation, descrambling and despreading, and obtain received data values for the subbands used for data transmission. The received data values may be expressed as:

$$R_d(k) = H(k) \cdot D(k) + N(k), \text{ for } k \in K_d, \qquad \text{Eq (7)}$$

where $D(k)$ is a transmitted data value for subband k;
$R_d(k)$ is a received data value for subband k; and
$K_d$ is the set of subbands used for data transmission.

The receiver may perform data detection (or equalization) in the frequency domain on the received data values using the MMSE technique, as follows:

$$Z_d(k) = \frac{R_d(k) \cdot \hat{H}^*(k)}{|\hat{H}(k)|^2 + \hat{N}_0}, \qquad \text{Eq (8)}$$

for $$k \in K_d,$$

where $Z_d(k)$ is a detected data value for subband k. Equation (8) is for data detection for one antenna. For multiple antennas, the receiver may derive a spatial filter matrix based on (1) the channel estimates for all transmitters transmitting in the same symbol period and (2) possibly the interference estimate. The receiver may then perform receiver spatial processing based on the spatial filter matrix to obtain the detected data values for each transmitter. The detected data values for all data subbands may be transformed with an IDFT/IFFT to obtain data symbol estimates.

Figure 12:
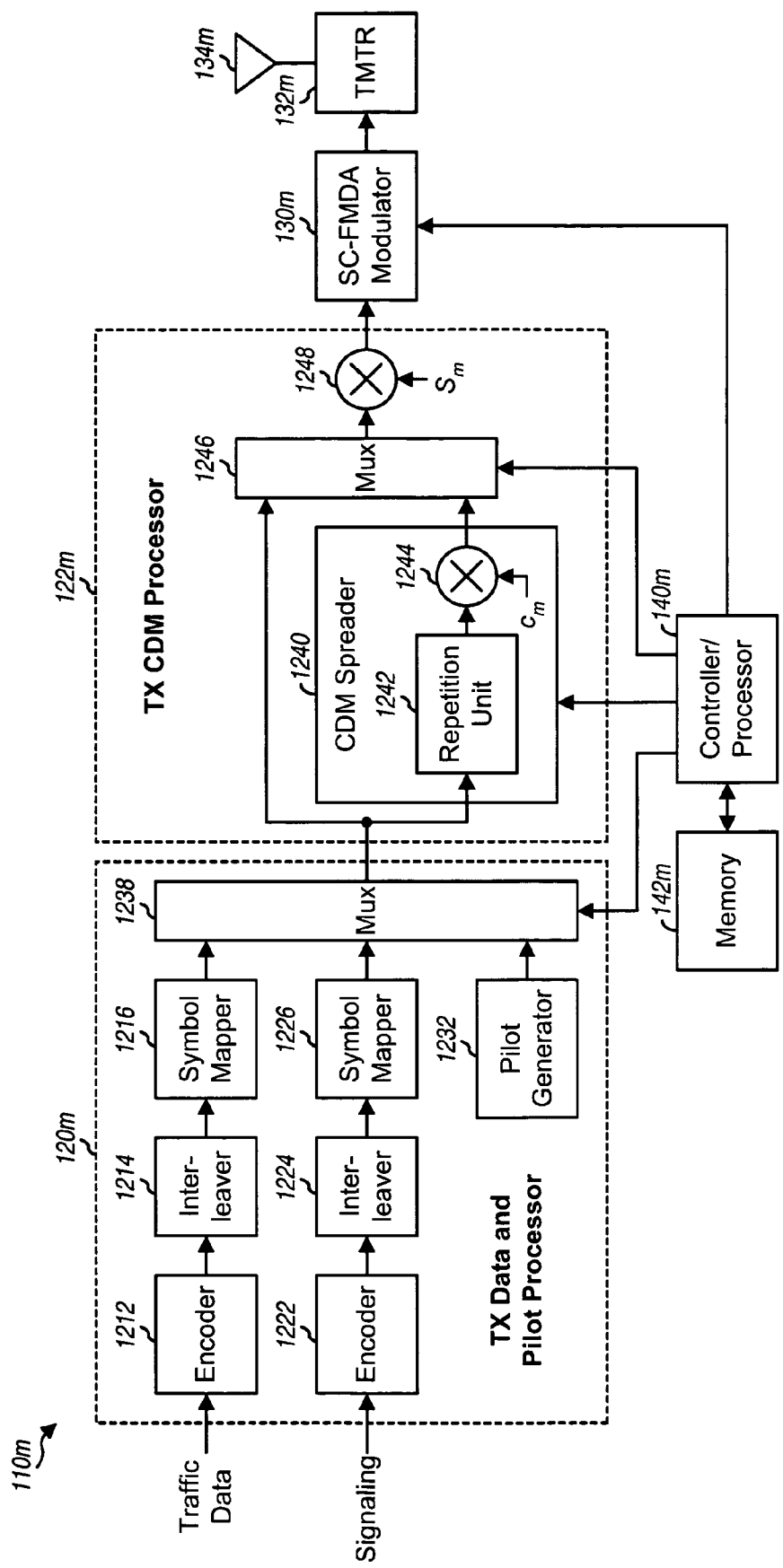
FIG. 12 shows a block diagram of a transmitter.

FIG. 12 shows an embodiment of transmitter 110m. Within TX data and pilot processor 120m, an encoder 1212 encodes traffic data based on a coding scheme selected for traffic data. An interleaver 1214 interleaves or reorders the coded traffic data based on an interleaving scheme. A symbol mapper 1216 maps the interleaved data bits to modulation symbols based on a modulation scheme selected for traffic data. An encoder 1222 encodes signaling based on a coding scheme selected for signaling. An interleaver 1224 interleaves the coded signaling based on an interleaving scheme. A symbol mapper 1226 maps the interleaved signaling bits to modulation symbols based on a modulation scheme selected for signaling. A pilot generator 1232 generates modulation symbols for pilot, e.g., based on a polyphase sequence having good temporal characteristics (e.g., a constant time-domain envelope) and good spectral characteristics (e.g., a flat frequency spectrum). A multiplexer (Mux) 1238 multiplexes the modulation symbols for traffic data, signaling, and pilot onto the appropriate sample periods and symbol periods.

TX CDM processor 122m performs spreading for CDM and scrambling. Within a CDM spreader 1240, a repetition unit 1242 repeats modulation symbols to be sent with CDM. A multiplier 1244 multiplies the replicated symbols with the L chips of an assigned spreading code $C_m$ and provides scaled modulation symbols. The same or different spreading codes may be used for different types of data. A multiplexer 1246 receives the unscaled modulation symbols from processor 120m and the scaled modulation symbols from CDM spreader 1240, provides the unscaled modulation symbols if CDM is not applied, and provides the scaled modulation symbols if CDM is applied. A multiplier 1248 multiplies the modulation symbols from multiplexer 1246 with an assigned scrambling code $S_m$ and provides processed modulation symbols.

Within controller/processor 140m, an FH generator determines the set of subbands to use for transmission in each time slot, e.g., based on a hop pattern assigned to transmitter 110m. SC-FDMA modulator 130m generates SC-FDMA symbols for traffic data, signaling, and pilot such that the modulation symbols are sent on the assigned subbands.

Figure 13:
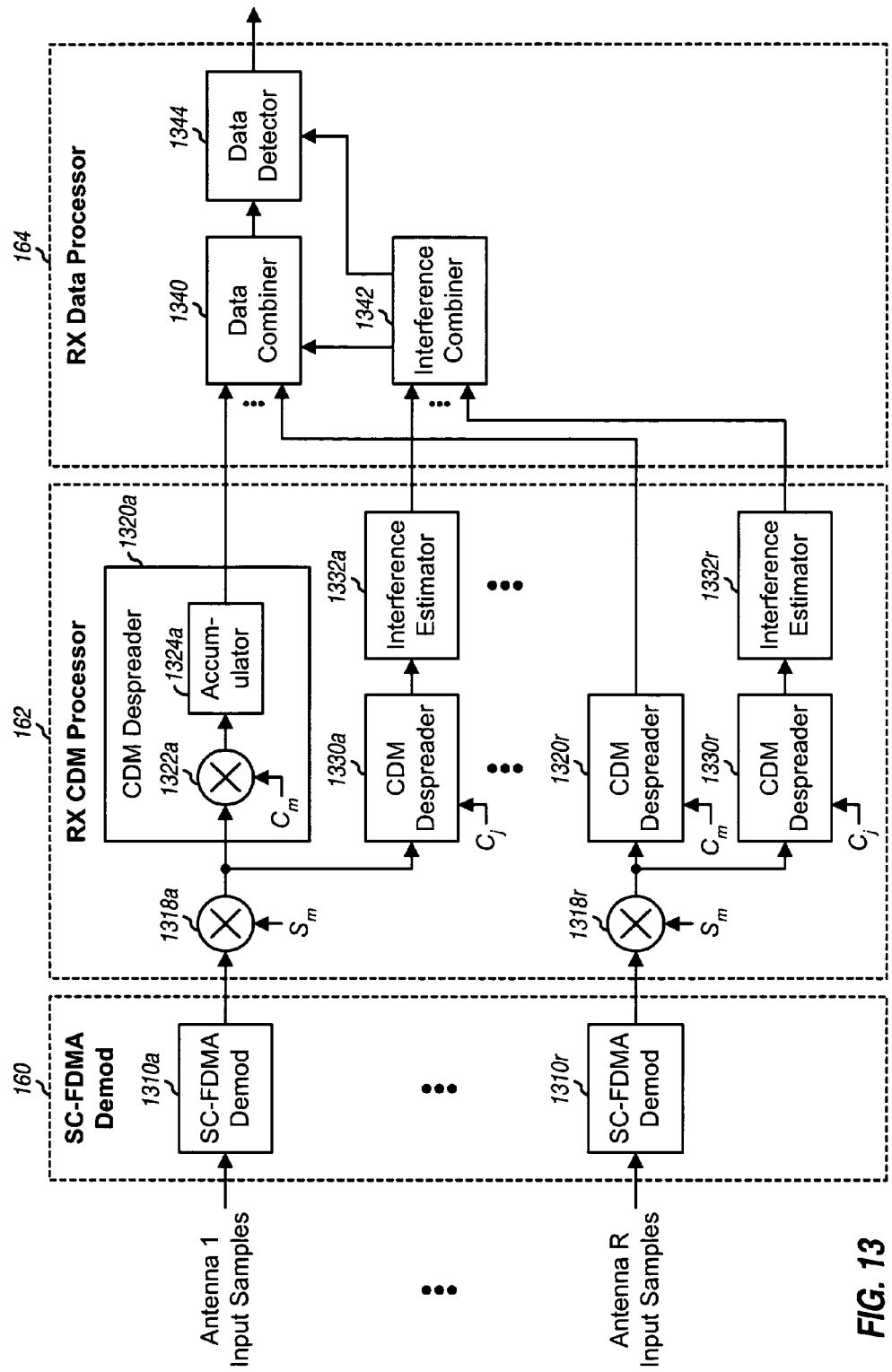
FIG. 13 shows a block diagram of a receiver.

FIG. 13 shows an embodiment of SC-FDMA demodulator 160, RX CDM processor 162, and RX data processor 164 at receiver 150 for data sent with CDM. For simplicity, FIG. 15 shows the processing to recover the data sent by one transmitter m.

Within SC-FDMA demodulator 160, R SC-FDMA demodulators 1310a through 1310r receive the input samples from R demultiplexers 156a through 156r, respectively. Each SC-FDMA demodulator 1310 performs SC-FDMA demodulation on its input samples and provides received symbols. Within RX CDM processor 162, R multipliers 1318a through 1318r obtain the received symbols from SC-FDMA demodulators 1310a through 1310r, respectively. For each receive antenna, multiplier 1318 multiples the received symbols with the scrambling code $S_m$ assigned to transmitter m. A CDM despreader 1320 performs despreading for transmitter m. Within CDM despreader 1320, a multiplier 1322 multiplies the descrambled symbols from multiplier 1318 with the spreading code $C_m$ assigned to transmitter m. An accumulator 1324 accumulates the output of multiplier 1322 over the length of the spreading code and provides despread symbols. A CDM despreader 1330 performs despreading for each unassigned spreading code. An interference estimator 1332 derives an interference estimate for each unassigned spreading code, e.g., as shown in equation (2).

Within RX data processor 164, a data combiner 1340 combines the despread symbols across the R receive antennas. An interference combiner 1342 combines the interference estimates across the R receive antennas, e.g., as shown in equation (3). Combiner 1340 and/or 1342 may perform maximal ratio combining (MRC) and may give more weight to symbols with greater reliability, e.g., symbols with less interference. A data detector 1344 performs non-coherent detection for the data symbols sent with CDM. Although not shown in FIG. 13, RX data processor 164 may also perform deinterleaving and decoding if interleaving and encoding, respectively, are performed by transmitter m for the data sent with CDM.

Figure 14:
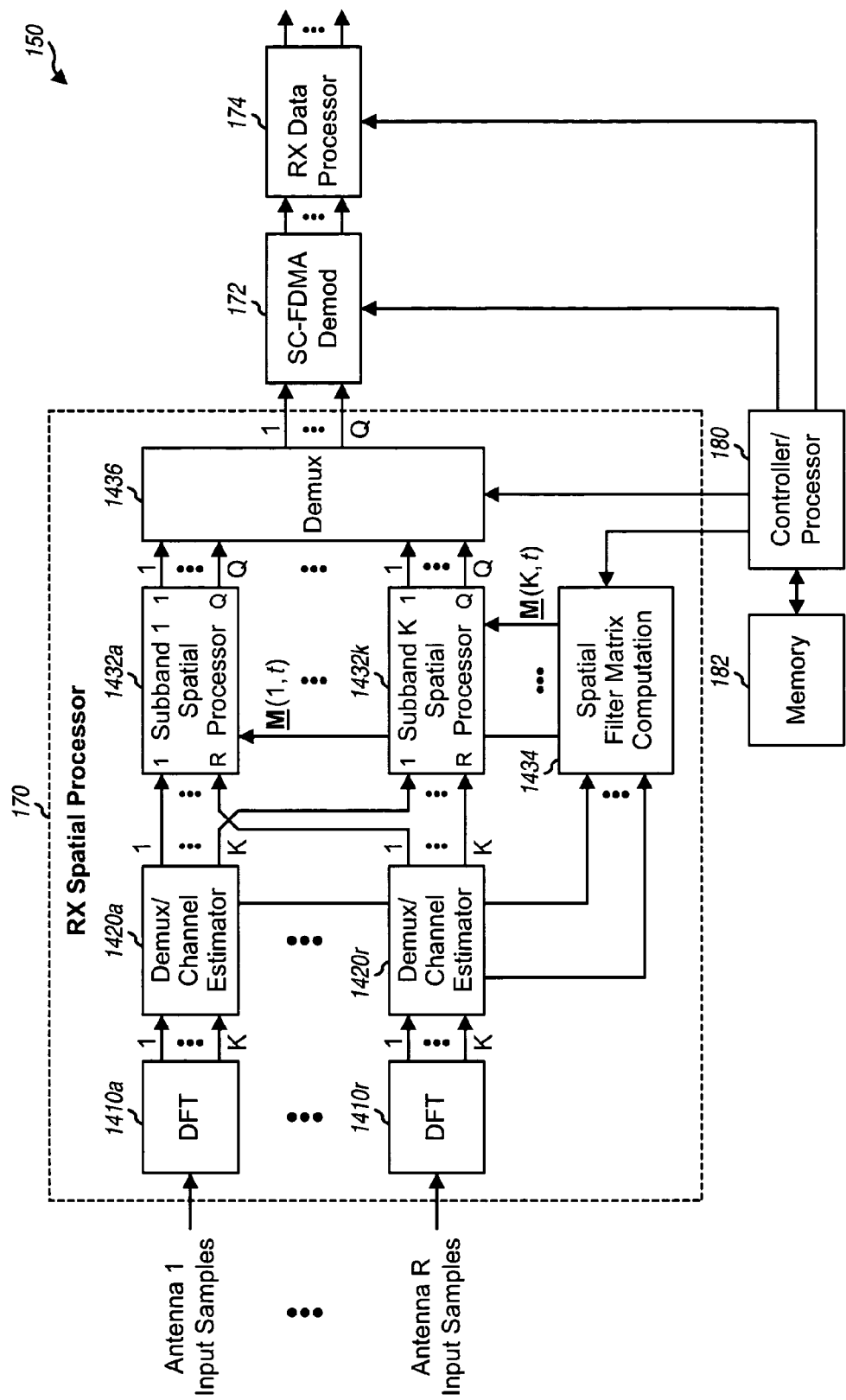
FIG. 14 shows a block diagram of a receive (RX) spatial processor.

FIG. 14 shows an embodiment of RX spatial processor 170. R DFT units 1410a through 1410r receive the input samples from R demultiplexers 156a through 156r, respectively. Each DFT unit 1410 performs a DFT on the input samples for each symbol period to obtain frequency-domain values for that symbol period. R demultiplexers/channel estimators 1420a through 1420r receive the frequency-domain values from DFT units 1410a through 1410r, respectively. Each demultiplexer 1420 provides frequency-domain values for data (or received data values) to K subband spatial processors 1432a through 1432k.

Each channel estimator 1420 performs descrambling and despreading on the frequency-domain values for pilot (or received pilot values), if the pilot was transmitted with scrambling and CDM, respectively. Each channel estimator 1420 derives a channel estimate for each transmitter based on the received pilot values for that transmitter. A spatial filter matrix computation unit 1434 forms a channel response matrix $\underline{H}(k,t)$ for each subband in each time slot based on the channel estimates for all transmitters using that subband and time slot. Computation unit 1434 then derives a spatial filter matrix $\underline{M}(k,t)$ for each subband of each time slot based on the channel response matrix $\underline{H}(k,t)$ and using zero-forcing (ZF), MMSE, or MRC technique. Computation unit 1434 provides K spatial filter matrices for the K subbands in each time slot.

Each subband spatial processor 1432 receives the spatial filter matrix for its subband, performs receiver spatial processing on the received data values with the spatial filter matrix, and provides detected data values. A demultiplexer 1436 maps the detected data values for each transmitter onto detected SC-FDMA symbols. A detected SC-FDMA symbol for a given transmitter is an SC-FDMA symbol that is obtained by receiver 150 for that transmitter with the interference from the other transmitters suppressed via the receiver spatial processing. SC-FDMA demodulator 172 processes each detected SC-FDMA symbol and provides data symbol estimates to RX data processor 174. SC-FDMA demodulator 172 may perform IDFT/IFFT, equalization, demapping of the data symbol estimates from the assigned subbands, and so on. SC-FDMA demodulator 172 also maps the data symbol estimates for the M transmitters onto M streams based on the traffic channels assigned to these transmitters. An FH generator within controller 180 determines the subbands used by each transmitter based on the hop pattern assigned to that transmitter. RX data processor 174 symbol demaps, deinterleaves, and decodes the data symbol estimates for each transmitter and provides the decoded data.

For the embodiment shown in FIG. 14, the receiver processing includes receiver spatial processing and SC-FDMA demodulation. The receiver spatial processing operates on frequency-domain values. The SC-FDMA demodulation includes the DFT/FFT performed by DFT units 1410 on the input samples to obtain frequency-domain values and the IDFT/IFFT performed by SC-FDMA demodulator 172 on the detected data values to obtain data symbol estimates. The receiver spatial processing and SC-FDMA demodulation may also be performed in other manners.

The techniques described herein may be implemented by various means. For example, these techniques may be implemented in hardware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a receiver may also be implemented with one or more ASICs, DSPs, processors, and so on.

For a software implementation, the techniques may be implemented with modules (e.g., procedures, functions, and so on) that perform the functions described herein. The software codes may be stored in memory (e.g., memory 142 or 182 in FIG. 1) and executed by a processor (e.g., controller 140 or 180). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An apparatus for wireless communication, comprising:
a processor operative to generate a modulation symbol for control information, to spread the modulation symbol for the control information with a spreading code by replicating the modulation symbol L times and multiplying the replicated modulation symbols with L chips of the spreading code to obtain L spread modulation symbols, where L is a length of the spreading code, and to generate at least one single-carrier frequency division multiple access (SC-FDMA) symbol based on the L spread modulation symbols and a set of contiguous subcarriers used for transmission; and
a memory coupled to the processor.

2. The apparatus of claim 1, wherein the processor is operative to perform spreading over at least one symbol period used by at least two transmitters for transmission.

3. The apparatus of claim 1, wherein the processor is operative to perform scrambling with a scrambling code.

4. The apparatus of claim 3, wherein different sectors are assigned different scrambling codes.

5. The apparatus of claim 1, wherein the processor is operative to perform spreading across symbols.

6. The apparatus of claim 1, wherein the processor is operative to generate L SC-FDMA symbols based on the L spread modulation symbols.

7. The apparatus of claim 1, wherein the processor is operative to generate an SC-FDMA symbol, to replicate the SC-FDMA symbol L times, and to multiply the replicated SC-FDMA symbols with the L chips of a-the spreading code.

8. The apparatus of claim 1, wherein the processor is operative to perform spreading across samples.

9. The apparatus of claim 1, wherein the processor is operative to generate a single SC-FDMA symbol based on the L spread modulation symbols.

10. The apparatus of claim 1, wherein the processor is operative to perform spreading across both symbols and samples.

11. The apparatus of claim 1, wherein the processor is operative to generate at least two SC-FDMA symbols based on the L spread modulation symbols.

12. The apparatus of claim 1, wherein the processor is operative to perform spreading across subcarriers.

13. The apparatus of claim 1, wherein at least one other spreading code is not assigned to any transmitter and is reserved for interference estimation.

14. The apparatus of claim 1, wherein the processor is operative to generate modulation symbols for at least two types of data and to perform spreading for at least one type of data among the at least two types of data.

15. The apparatus of claim 1, wherein the processor is operative to generate modulation symbols for traffic data and control information and to perform spreading for control information.

16. The apparatus of claim 1, wherein the processor is operative to generate SC-FDMA symbols having at least two different durations.

17. The apparatus of claim 1, wherein the processor is operative to generate modulation symbols for traffic data and control information, to generate SC-FDMA symbols having a first duration for traffic data, and to generate SC-FDMA symbols having a second duration for control information, the second duration being shorter or longer than the first duration.

18. The apparatus of claim 1, wherein the processor is operative to generate modulation symbols for traffic data and pilot, to generate SC-FDMA symbols having a first duration for traffic data, and to generate SC-FDMA symbols having a second duration for pilot, the second duration being shorter or longer than the first duration.

19. The apparatus of claim 1, wherein the processor is operative to generate SC-FDMA symbols having a first duration for data sent without spreading and to generate SC-FDMA symbols having a second duration for data sent with spreading, the second duration being shorter or longer than the first duration.

20. The apparatus of claim 1, further comprising:
a controller operative to determine different sets of subcarriers to use for transmission in different time slots based on a frequency hopping pattern.

21. A method of wireless communication, comprising:
generating a modulation symbol for control information;
spreading the modulation symbol for the control information with a spreading code by replicating the modulation symbol L times and multiplying the replicated modulation symbols with L chips of the spreading code to obtain L spread modulation symbols, where L is a length of the spreading code; and
generating at least one single-carrier frequency division multiple access (SC-FDMA) symbol based on the L spread modulation symbols and a set of contiguous subcarriers used for transmission.

22. The method of claim 21, further comprising:
performing scrambling with a scrambling code.

23. The method of claim 21, wherein the spreading comprises spreading the modulation symbol with the spreading code across symbols, or across samples, or across subcarriers, or a combination thereof.

24. The method of claim 21, wherein the spreading comprises spreading the modulation symbol with the spreading code for at least one type of data among at least two types of data being transmitted.

25. The method of claim 21, further comprising:
generating SC-FDMA symbols having at least two different durations for at least two types of data being transmitted.

26. The method of claim 21, further comprising:
performing spreading over at least one symbol period used by at least two transmitters for transmission.

27. The method of claim 21, wherein the generating the at least one SC-FDMA symbol comprises generating L SC-FDMA symbols based on the L spread modulation symbols.

28. The method of claim 21, wherein the generating the at least one SC-FDMA symbol comprises generating a single SC-FDMA symbol based on the L spread modulation symbols.

29. An apparatus for wireless communication, comprising:
means for generating a modulation symbol for control information;
means for spreading the modulation symbol for the control information with a spreading code by replicating the modulation symbol L times and multiplying the replicated modulation symbols with L chips of the spreading code to obtain L spread modulation symbols, where L is a length of the spreading code; and
means for generating at least one single-carrier frequency division multiple access (SC-FDMA) symbol based on the L spread modulation symbols and a set of contiguous subcarriers used for transmission.

30. The apparatus of claim 29, further comprising:
means for performing scrambling with a scrambling code.

31. The apparatus of claim 29, wherein the means for spreading comprises means for spreading the modulation symbol with the spreading code across symbols, or across samples, or across subcarriers, or a combination thereof.

32. The apparatus of claim 29, wherein the means for spreading comprises means for spreading the modulation symbol with the spreading code for at least one type of data among at least two types of data being transmitted.

33. The apparatus of claim 29, further comprising:
means for generating SC-FDMA symbols having at least two different durations for at least two types of data being transmitted.

34. The apparatus of claim 29, further comprising:
means for performing spreading over at least one symbol period used by at least two transmitters for transmission.

35. The apparatus of claim 29, wherein the means for generating the at least one SC-FDMA symbol comprises means for generating L SC-FDMA symbols based on the L spread modulation symbols.

36. The apparatus of claim 29, wherein the means for generating the at least one SC-FDMA symbol comprises means for generating a single SC-FDMA symbol based on the L spread modulation symbols.

37. An apparatus for wireless communication, comprising:
a processor operative to receive at least one single-carrier frequency division multiple access (SC-FDMA) symbol comprising control information, to perform SC-FDMA demodulation on the at least one received SC-FDMA symbol to obtain received symbols from a set of contiguous subcarriers used for transmission in at least one symbol period, and to despread the received symbols with L chips of a spreading code to recover a modulation symbol for the control information, where L is a length of the spreading code; and
a memory coupled to the processor.

38. The apparatus of claim 37, wherein multiple transmitters transmit SC-FDMA symbols with spreading in the at least one symbol period assigned to the transmitters for transmission.

39. The apparatus of claim 37, wherein the processor is operative to perform despreading across symbols, or across samples, or across subcarriers, or a combination thereof.

40. The apparatus of claim 37, wherein the processor is operative to perform descrambling with a scrambling code.

41. The apparatus of claim 37, wherein the processor is operative to derive an interference estimate based on at least one other spreading code not assigned to any transmitter.

42. The apparatus of claim 41, wherein the processor is operative to perform data detection based on the interference estimate.

43. The apparatus of claim 41, wherein the processor is operative to derive a channel estimate and to perform data detection based on the channel estimate and the interference estimate.

44. The apparatus of claim 37, wherein the processor is operative to obtain despread symbols for multiple antennas, to combine the despread symbols across the multiple antennas, and to perform data detection after combining across the multiple antennas.

45. The apparatus of claim 37, wherein the processor is operative to perform receiver spatial processing for SC-FDMA symbols transmitted without spreading by at least two transmitters in a symbol period.

46. The apparatus of claim 37, further comprising:
a controller operative to determine different sets of subcarriers used for transmission in different time slots based on a frequency hopping pattern.

47. The apparatus of claim 37, wherein the processor is operative to perform SC-FDMA demodulation on L received SC-FDMA symbols to obtain received symbols for L symbol periods, and to despread the received symbols with the L chips of the spreading code to recover the modulation symbol.

48. The apparatus of claim 37, wherein the processor is operative to perform SC-FDMA demodulation on a single received SC-FDMA symbol to obtain received symbols for L sample periods or L subcarriers, and to despread the received symbols with the L chips of the spreading code to recover the modulation symbol.

49. A method of wireless communication, comprising:
receiving at least one single-carrier frequency division multiple access (SC-FDMA) symbol comprising control information;
performing SC-FDMA demodulation on the at least one received SC-FDMA symbol to obtain received symbols from a set of contiguous subcarriers used for transmission in at least one symbol period; and
despreading the received symbols with L chips of a spreading code to recover a modulation symbol for the control information, where L is a length of the spreading code.

50. The method of claim 49, wherein the despreading comprises despreading the received symbols with the spreading code across symbols, or across samples, or across subcarriers, or a combination thereof 51. The method of claim 49, further comprising:
performing descrambling with a scrambling code.

52. The method of claim 49, further comprising:
deriving an interference estimate based on at least one other spreading code not assigned to any transmitter.

53. The method of claim 49, wherein the performing SC-FDMA demodulation comprises performing SC-FDMA demodulation on L received SC-FDMA symbols to obtain received symbols for L symbol periods, and wherein the despreading comprises despreading the received symbols for the L symbol periods with the L chips of the spreading code to recover the modulation symbol.

54. The method of claim 49, wherein the performing SC-FDMA demodulation comprises performing SC-FDMA demodulation on a single received SC-FDMA symbol to obtain received symbols for L sample periods or L subcarriers, and wherein the despreading comprises despreading the received symbols for the L sample periods or the L subcarriers with the L chips of the spreading code to recover the modulation symbol.

55. An apparatus for wireless communication, comprising:
means for receiving at least one single-carrier frequency division multiple access (SC-FDMA) symbol comprising control information;
means for performing SC-FDMA demodulation on the at least one received SC-FDMA symbol to obtain received symbols from a set of contiguous subcarriers used for transmission in at least one symbol period; and
means for despreading the received symbols with L chips of a spreading code to recover a modulation symbol for the control information, where L is a length of the spreading code.

56. The apparatus of claim 55, further comprising:
means for performing descrambling with a scrambling code.

57. The apparatus of claim 55, wherein the means for despreading comprises means for despreading the received symbols with the spreading code across symbols, or across samples, or across subcarriers, or a combination thereof.

58. The apparatus of claim 55, further comprising:
means for deriving an interference estimate based on at least one other spreading code not assigned to any transmitter.

59. The apparatus of claim 55, wherein the means for performing SC-FDMA demodulation comprises means for performing SC-FDMA demodulation on L received SC-FDMA symbols to obtain received symbols for L symbol periods, and wherein the means for despreading comprises means for despreading the received symbols for the L symbol periods with the L chips of the spreading code to recover the modulation symbol.

60. The apparatus of claim 55, wherein the means for performing SC-FDMA demodulation comprises means for performing SC-FDMA demodulation on a single received SC-FDMA symbol to obtain received symbols for L sample periods or L subcarriers, and wherein the means for despreading comprises means for despreading the received symbols for the L sample periods or the L subcarriers with the L chips of the spreading code to recover the modulation symbol.

61. A non-transitory computer-readable medium comprising:
 code for causing at least one processor to generate a modulation symbol for control information,
 code for causing the at least one processor to spread the modulation symbol for the control information with a spreading code by replicating the modulation symbol L times and multiplying the replicated modulation symbols with L chips of the spreading code to obtain L spread modulation symbols, where L is a length of the spreading code, and
 code for causing the at least one processor to generate at least one single-carrier frequency division multiple access (SC-FDMA) symbol based on the L spread modulation symbols and a set of contiguous subcarriers used for transmission.

62. A non-transitory computer-readable medium comprising:
 code for causing at least one processor to receive at least one single-carrier frequency division multiple access (SC-FDMA) symbol comprising control information,
 code for causing the at least one processor to perform SC-FDMA demodulation on the at least one received SC-FDMA symbol to obtain received symbols from a set of contiguous subcarriers used for transmission in at least one symbol period, and
 code for causing the at least one processor to despread the received symbols with L chips of a spreading code to recover a modulation symbol for the control information, where L is a length of the spreading code.

\* \* \* \* \*